United States Patent
Arita et al.

(10) Patent No.: US 8,854,646 B2
(45) Date of Patent: *Oct. 7, 2014

(54) PRINTING DEVICE AND CONTROL METHOD OF PRINTING DEVICE

(75) Inventors: Shunsuke Arita, Tokyo (JP); Shigeru Toyazaki, Kanagawa (JP); Shinya Nohdomi, Kanagawa (JP); Hidetoshi Suzuki, Kanagawa (JP); Takeya Satou, Tokyo (JP); Muneyoshi Akai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 13/617,133

(22) Filed: Sep. 14, 2012

(65) Prior Publication Data

US 2013/0070270 A1    Mar. 21, 2013

(30) Foreign Application Priority Data

Sep. 16, 2011  (JP) ................................. 2011-203701
Aug. 24, 2012  (JP) ................................. 2012-185917

(51) Int. Cl.
*G06K 15/00* (2006.01)
*G06K 15/02* (2006.01)

(52) U.S. Cl.
CPC ........ *G06K 15/1809* (2013.01); *G06K 15/1814* (2013.01)
USPC ........ 358/1.13; 358/1.15; 358/1.16; 358/448; 358/498

(58) Field of Classification Search
CPC ............. G06F 3/1236; H04N 1/00567; H04N 1/2346; H04N 1/32363; H04N 1/32771
USPC ........ 358/1.13–1.15, 1.4, 1.5, 1.9, 1.16, 1.17, 358/2.1, 448, 498
See application file for complete search history.

(56) References Cited

U.S. PATENT DOCUMENTS

| | | | |
|---|---|---|---|
| 6,179,409 B1 * | 1/2001 | Takahashi | 347/43 |
| 6,624,904 B2 * | 9/2003 | Kimizuka et al. | 358/1.12 |
| 7,463,370 B2 * | 12/2008 | Yada et al. | 358/1.1 |
| 2005/0099660 A1 * | 5/2005 | Yada et al. | 358/498 |
| 2006/0023231 A1 * | 2/2006 | Ohmiya | 358/1.7 |
| 2008/0174802 A1 * | 7/2008 | Sampath et al. | 358/1.13 |
| 2012/0019860 A1 | 1/2012 | Fujiwara | |
| 2012/0062930 A1 | 3/2012 | Toyazaki | |

(Continued)

FOREIGN PATENT DOCUMENTS

| | | |
|---|---|---|
| JP | 11-165450 | 6/1999 |
| JP | 2002-046305 | 2/2002 |

*Primary Examiner* — Dennis Dicker
(74) *Attorney, Agent, or Firm* — Oblon, Spivak, McClelland, Maier & Neustadt, L.L.P.

(57) ABSTRACT

A printing device includes a storage unit configured to store image data transferred from a high level device; a conveyance control unit configured to control conveyance of a printing medium and output a notification of a printable state when the printing medium is conveyed to reach a predetermined printable state; a printing unit configured to print the image data stored in the storage unit on the printing medium in response to the notification of the printable state output from the conveyance control unit; and a printing control unit configured to create print setting information including conveyance control information to control conveyance of the printing medium from printing information specified from the high level device and transmit the print setting information at least to the conveyance control unit. The conveyance control unit controls conveyance of the printing medium in accordance with the conveyance control information included in the print setting information.

5 Claims, 24 Drawing Sheets

(56) References Cited

U.S. PATENT DOCUMENTS

| | | |
|---|---|---|
| 2012/0069362 A1 | 3/2012 | Konno |
| 2012/0069363 A1* | 3/2012 | Nohdomi .................. 358/1.9 |
| 2012/0069402 A1 | 3/2012 | Konno |
| 2013/0188206 A1* | 7/2013 | Nakata et al. ............. 358/1.9 |

* cited by examiner (TO IMAGE OUTPUT UNIT)

FIG.12

| NO. | CLASSIFICATION | NAME | DIRECTION (DFE⇔PCTL) | CONTENTS |
|---|---|---|---|---|
| 1 | JOB INFORMATION | JOB START | ⇕ | NOTIFY/RESPONSE JOB START COMMUNICATE JOB IDENTIFIER (JOBID) |
| 2 | | JOB END | ⇕ | NOTIFY/RESPOND TO COMPLETE ALL PRINTING PROCESSES REQUESTED IN JOB COMMUNICATE JOB IDENTIFIER (JOBID) |
| 3 | | START OF RECEIVING PRINTING PROCESS | ↓ | NOTIFY THAT PRINTER MAY RECEIVE PRINTING PROCESS |
| 4 | | REQUEST/NOTIFY OF PRINTER INFORMATION | ⇕ | REQUEST/NOTIFY NECESSARY PRINTER INFORMATION |
| 5 | | START OF PRINTING PROCESS | ⇕ | NOTIFY/RESPOND THAT IMAGE DATA IS READY OUTPUT ORDER, PAGE (PROCESS) UNIT |
| 6 | PRINTER STATUS/ PRINTING PROCESS | REQUEST OF PRINTING PROCESS | ⇕ | REQUEST/RESPOND TO PRINTING PROCESS BY PRINTER CONTROLLER COLOR, PROCESS IDENTIFICATION NUMBER, PLANE IDENTIFICATION NUMBER REQUEST IN ORDER OF REQUEST OF ENGINE IN PLANE UNIT *BIT MAP IS TAKEN FROM ENGINE |
| 7 | | DATA TRANSFER COMPLETION | ↑ | NOTIFY THAT REQUESTED PLANE IS COMPLETELY TRANSFERRED |
| 8 | | DATA RECEPTION COMPLETION | ↓ | NOTIFY THAT REQUESTED PLANE IS COMPLETELY RECEIVED |
| 9 | | PRINTING PROCESS COMPLETION | ↑ | NOTIFY COMPLETION OF PRINTING REQUEST OF ALL PAGES (PROCESS) |
| 10 | | REPORT OF PROCESS STATUS | ↓ | NOTIFY PRINTING STATUS OF PROCESS · PAPER FEEDING · PAPER DISCHARGING · PRINT STARTING |
| 11 | | SC NOTIFICATION ERROR OCCURRENCE/ REMOVAL | ⇕ ↑ | OBTAIN/NOTIFY PRINTER ERROR INFORMATION NOTIFY ERROR OCCURRENCE/REMOVAL OF HIGH LEVEL DEVICE |
| 12 | PRINTING CONDITION | SETTING OF PRINTING CONDITION | ⇕ | NOTIFY/RESPOND TO PRINTING CONDITION · PRINTING TYPE (DUPLEX/SINGLE SIDE) · PRINTING KIND (WITH DATA/EMPTY PAGE) · PAPER FEEDING/DISCHARGING INFORMATION (PAPER FEEDING SOURCE/ PAPER DISCHARGING DESTINATION) · PRINTING SURFACE ORDER (FRONT → REAR/ REAR → FRONT) · PRINTING PAPER KIND (CUT SHEET/CONTINUOUS FORMS PAPER) · PRINTING PAPER SIZE · PRINTING DATA SIZE · RESOLUTION, GRADATION · COLOR INFORMATION, ETC. |
| 13 | CONNECTION | REGISTRATION/RELEASE | ⇕ | REGISTRATION/RELEASE BOTH HIGH LEVEL DEVICE AND PRINTER CONTROLLER |

FIG.14

| ITEM NUMBER | COLOR | CONTENTS | SETTING CONTENTS |
|---|---|---|---|
| 1 | COMMON | PBID | PAGE IDENTIFIER |
| 2 | | NUMBER OF DATA PER PAGE | NUMBER OF COLORS (MONOCHROME: 1, FULL COLOR: 4) |
| 3 | | FOR PRINTING | |
| 4 | | RESOLUTION | MAIN SCANNING: PRINTING RESOLUTION |
| 5 | | | SUB SCANNING: PRINTING RESOLUTION |
| 6 | | GRADATION | BIT NUMBER PER PIXEL |
| 7 | | PAPER CONVEYANCE LENGTH | NUMBER OF DOTS IN PAPER CONVEYANCE DIRECTION |
| 8 | | PAPER WIDTH | NUMBER OF DOTS IN PAPER WIDTH DIRECTION |
| 9 | | SURFACE TO BE PRINTED | FRONT/REAR |
| 10 | | PAPER FEED TRAY SELECTION | PAPER FEED TRAY IDENTIFIER (CONTINUOUS FORMS PAPER: 0, PAPER FEED TRAY 1: 1, PAPER FEED TRAY 2: 2···) |
| 11 | | PAPER DISCHARGE TRAY SELECTION | PAPER DISCHARGE TRAY IDENTIFIER (CONTINUOUS FORMS PAPER: 0, PAPER DISCHARGE TRAY 1: 1, PAPER DISCHARGE TRAY 2: 2···) |
| 12 | C | COLOR IDENTIFIER | CYAN |
| 13 | | FOR DATA TRANSFER | |
| 14 | | DATA TRANSFER | REQUIRED/NO REQUIRED |
| 15 | | ADDRESS OF DATA TRANSFERRING SOURCE | |
| 16 | | ADDRESS OF DATA STORING DESTINATION | |
| 17 | | DATA TRANSFER SIZE | BYTE SIZE INCLUDING BOUNDARY ADJUSTMENT SIZE |
| 18 | | FOR PRINTING | |
| 19 | | PRINT | REQUIRED/NO REQUIRED |
| 20 | | UP IN NONPRINTABLE REGION | NONPRINTABLE REGION AT UPPER SIDE OF PAPER |
| 21 | | DOWN IN NONPRINTABLE REGION | NONPRINTABLE REGION AT LOWER SIDE OF PAPER |
| 22 | | LEFT OF NONPRINTABLE REGION | NONPRINTABLE REGION AT LEFT SIDE OF PAPER |
| 23 | | RIGHT OF NONPRINTABLE REGION | NONPRINTABLE REGION AT RIGHT SIDE OF PAPER |
| 24 | | IMAGE INFORMATION | |
| 25 | | X-DIRECTION EFFECTIVE SIZE | NUMBER OF EFFECTIVE DOTS IN MAIN SCANNING DIRECTION THAT DO NOT INCLUDE BOUNDARY ADJUSTMENT |
| 26 | | Y-DIRECTION EFFECTIVE SIZE | NUMBER OF EFFECTIVE DOTS IN SUB SCANNING DIRECTION THAT DO NOT INCLUDE BOUNDARY ADJUSTMENT |
| 27 | M | SAME AS C (BUT, COLOR IDENTIFIER IS MAGENTA) | |
| 28 | Y | SAME AS C (BUT, COLOR IDENTIFIER IS YELLOW) | |
| 29 | K | SAME AS C (BUT, COLOR IDENTIFIER IS BLACK) | |

PRINTING DEVICE AND CONTROL METHOD OF PRINTING DEVICE

CROSS-REFERENCE TO RELATED APPLICATIONS

The present application claims priority to and incorporates by reference the entire contents of Japanese Patent Application No. 2011-203701 filed in Japan on Sep. 16, 2011 and Japanese Patent Application No. 2012-185917 filed in Japan on Aug. 24, 2012.

BACKGROUND OF THE INVENTION

1. Field of the Invention

The present invention relates to a printing device that performs printing on continuous forms paper or a cut sheet and a control method of the printing device.

2. Description of the Related Art

As the high quality of a printed image and a high printing speed in the printing device are proceeding, high performance and multi functions of a printer control device (controller) that controls the printer device are correspondingly proceeding. Meanwhile, the high performance and multi-functional printer control device may have complicated configuration and a longer development time may be required. Therefore, a technology that controls not only a printer device having a low printing speed but also a printer device having a high printing speed using the same architecture and controls various printer devices using one kind of printer control device has been developed.

Japanese Patent Application Laid-open No. 11-165450 discloses a configuration in which a plurality of expansion slots are provided in a CPU board in which a CPU (central processing unit) is mounted, and a transfer board that transfers data to various printer engines is loaded in the expansion slots. According to Japanese Patent Application Laid-open No. 11-165450, it is possible to implement a printer control device that controls any of a single engine type and a tandem engine type.

However, schematically, a paper which is a printing target of the printer device is broadly divided into continuous forms paper which is provided as a roll paper and has continuous pages and a cut sheet which is cut to have a predetermined size such as A4 or B4 and provided. The continuous forms paper and the cut sheet have different concepts in view of pages and thus paper conveyance control is also different accordingly.

Therefore, a printer control device that is capable of performing high quality printing at a high speed and being applied to both the continuous forms paper and the cut sheet.

In the above-mentioned Japanese Patent Application Laid-open No. 11-165450, a transfer board is added to the expansion slots so as to be applied to the printer control device to a plurality of kinds of engines. However, Japanese Patent Application Laid-open No. 11-165450 fails to commonly control conveyance of paper when the conveyance control of paper such as the continuous forms paper and the cut sheet is different.

There is a need to enable common control for different paper conveyance methods.

SUMMARY OF THE INVENTION

It is an object of the present invention to at least partially solve the problems in the conventional technology.

A printing device includes: a storage unit configured to store image data transferred from a high level device; a conveyance control unit configured to control conveyance of a printing medium and output a notification of a printable state when the printing medium is conveyed to reach a predetermined printable state; a printing unit configured to print the image data stored in the storage unit on the printing medium in response to the notification of the printable state output from the conveyance control unit; and a printing control unit configured to create print setting information including conveyance control information to control conveyance of the printing medium from printing information specified from the high level device and transmit the print setting information at least to the conveyance control unit. The conveyance control unit controls conveyance of the printing medium in accordance with the conveyance control information included in the print setting information.

A control method of a printing device includes: a storing step in which a storage unit stores image data transferred from a high level device; a conveyance control step in which a conveyance control unit controls conveyance of a printing medium and outputs a notification of a printable state when the printing medium is conveyed to reach a predetermined printable state; a printing step in which a printing unit prints the image data stored in the storing step on the printing medium in response to the notification of the printable state output in the conveyance control step; and a printing control step in which a printing control unit creates print setting information including conveyance control information to control conveyance of the printing medium from printing information specified from the high level device and transmits the print setting information at least to the conveyance control unit. In the conveyance control step, conveyance of the printing medium is controlled in accordance with the conveyance control information included in the print setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a schematic diagram illustrating an example of control information which is transmitted and received between a high level device and a printer controller through a control line;

FIG. 14 is a schematic diagram illustrating an example of a setting information table according to an embodiment;

DETAILED DESCRIPTION OF THE PREFERRED EMBODIMENTS

Hereinafter, with reference to accompanying drawings, embodiments of a printing device and a control method of the printing device will be described in detail. First, for the sake of easy understanding, production printing to which a printing system according to an embodiment is applied will be roughly described. The production printing is basically considered to perform a large amount of printing in a short time. Therefore, in the production printing, printing speed is intended to be increased and a system for a workflow to manage from creation of printing data to distribution of printed material is built in order to efficiently perform management of jobs and printing data.

The printing system according to the embodiment relates to a part that performs printing in the workflow of the production printing, and RIP (raster image process) processing and the printing of bit map data obtained by the RIP processing are performed by separate devices. The RIP processing requires the longest processing time in printing processing. Therefore, printing speed can be increased by separating a device of performing the RIP processing and a device of performing the print processing.

Outline of Printing System which is Applicable to an Embodiment

Figure 1:
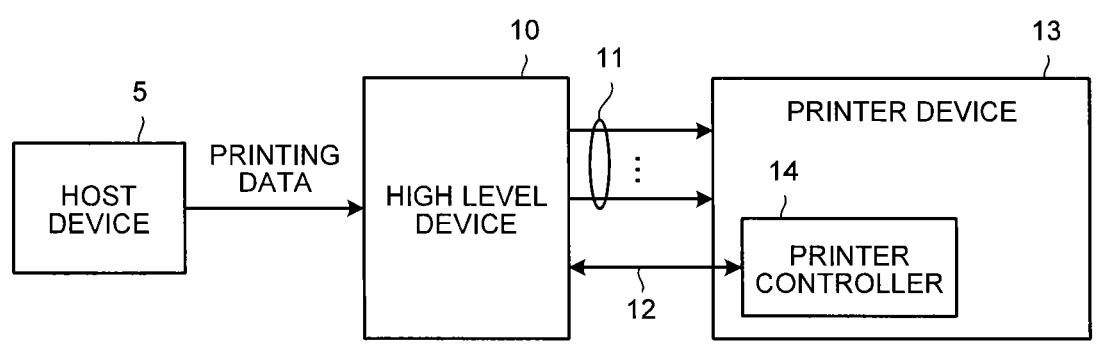
FIG. 1 is a block diagram illustrating a configuration of an example of a printing system which is applicable to an embodiment.

FIG. 1 illustrates a configuration of an example of a printing system which is applicable to an embodiment of the present invention. The printing system is configured such that a high level device 10 and a printer device 13 as an image forming device are connected by a plurality of data lines 11 and a control line 12. A host device 5 is, for example, a computer and generates print job data including printing image data and print setting information.

The print job data, for example, includes data described by a page description language (PDL) (hereinafter, referred to as PDL data). By interpreting the PDL data, printing image data consisting of a bit map image to be printed, and print setting information related to print setting such as information on a page, information on layout, and information indicating number of print sets at the time of printing are generated.

The high level device 10 performs the RIP processing in accordance with print job data supplied from the host device 5 and creates bit map data for each color which is printing image data. Together with this, the high level device 10 creates control information to control printing operation based on the print job data, information from the host device 5 and/or the like.

The printing image data for each color which is created by the high level device 10 is supplied to a printer engine unit, which is not illustrated, of the printer device 13 through a plurality of data lines 11. Further, control information to control printing is transmitted and received between the high level device 10 and a printer controller 14 through the control line 12. The printer controller 14 controls the printer engine based on transmission and reception of the control information to form an image on a printing medium and perform printing in accordance with the print job.

A printing method is not specifically limited, but in this embodiment, printing paper is used as the printing medium to form a printing image on printing paper by an ink-jet method. The present invention is not limited thereto, but the embodiment is also applicable to a printing device that forms a printing image on printing paper using toner.

As the printing paper, continuous forms paper (continuous stationery) in which cuttable perforations are formed with a predetermined interval or a cut sheet which is cut in a predetermined size (A4 or B4) may be used. In the continuous forms paper, a page is, for example, assumed to be an area interposed between the perforations formed at a predetermined interval. Further, in the cut sheet, one page is assumed to be one side of one sheet of printing paper.

Even though details will be described later, a printer engine having a dedicated configuration to perform printing is used for each of a case when the continuous forms paper is used and a case when the cut sheet is used as the printing paper. Further, the printer controller that controls the printer engine may be commonly used in a case when the continuous forms paper is used and in a case when the cut sheet is used as the printing paper.

Meanwhile, a printing medium that is a printing target of the printing system according to the embodiment is not limited to printing paper made of paper. In other words, another type of a printing medium may be used if printing on the printing medium can be performed by a printing method which is applied to the embodiment. For example, a plastic film or a fabric may be used as a printing medium.

High Level Device

Figure 2A:
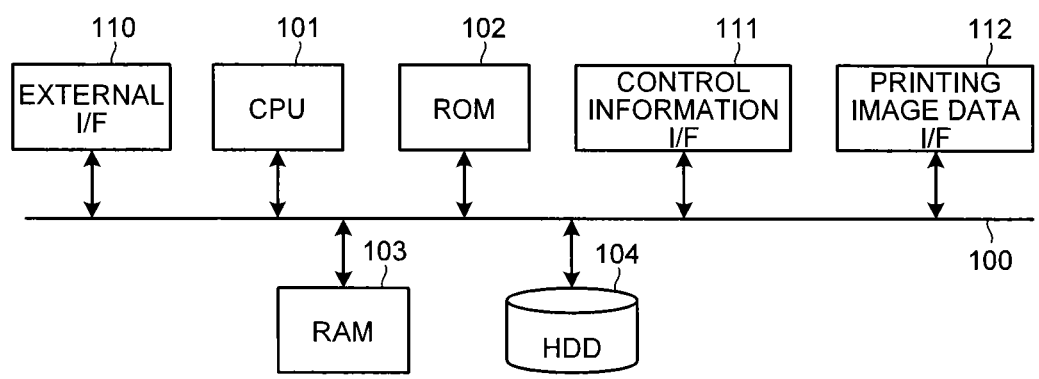
FIG. 2A is a block diagram illustrating a configuration of an example of a high level device which is applicable to an embodiment.

FIG. 2A illustrates a configuration of an example of the high level device 10. A CPU (central processing unit) 101, a ROM (read only memory) 102, a RAM (random access memory) 103, and a hard disk drive (HDD) 104 are connected to a bus 100. Further, an external I/F 110, a control information I/F 111, and a printing image data I/F 112 are connected to the bus 100. These components connected to the bus 100 communicate with each other through the bus 100.

In the ROM 102 and the HDD 104, a program to operate the CPU 101 is stored in advance. The RAM 103 is used as working memory of the CPU 101. In other words, the CPU 101 uses the RAM as the working memory in accordance with the program stored in the ROM 102 and the HDD 104 to control overall operation of the high level device 10.

The external I/F 110 supports, for example, a TCP/IP (transmission control protocol/Internet protocol) and controls communication with the host device 5. The control information I/F 111 controls communication of control information. Further, the printing image data I/F 112 controls communication of printing image data and includes a plurality of channels. For example, the printing image data for each color of Y (yellow), C (cyan), M (magenta), and K (black) created in the high level device 10 is output from the plurality of channels. The printing image data I/F 112 is required to offer a high transfer speed so that for example, PCI express (peripheral component interconnect bus express) is used. A method for control information I/F 111 is not specifically limited, but it is assumed here that PCI express is used similarly to the printing image data I/F 112.

With this configuration, the print job data transmitted from the host device 5 is received by the external I/F 110 of the high level device 10 and then stored in the HDD 104 through the CPU 101. The CPU 101 performs the RIP processing based on print job data read out from the HDD 104 and generates bit map data for each color to write the bit map data in the RAM 103. For example, the CPU 101 renders PDL data by the RIP processing to generate the bit map data for each color and write the bit map data in the RAM 103. The CPU 101 compression-codes the bit map data for each color which is written in the RAM 103 to temporarily store in the HDD 104.

When, for example, the printing operation in the printer device 13 starts, the CPU 101 reads out the compression-coded bit map data for each color from the HDD 104 to decode the compression code and write expanded bit map data for each color in the RAM 103. The CPU 101 reads out the bit map data for each color from the RAM 103 to cause the bit map data, as printing image data for each color, to be output from a corresponding one of the channels of the printing image data I/F 112 and supplied to the printer device 13. Further, the CPU 101 transmits and receives control information to control printing to and from the printer device 13 through the control information I/F 111 in accordance with progress of printing operation and/or the like.

Figure 2B:
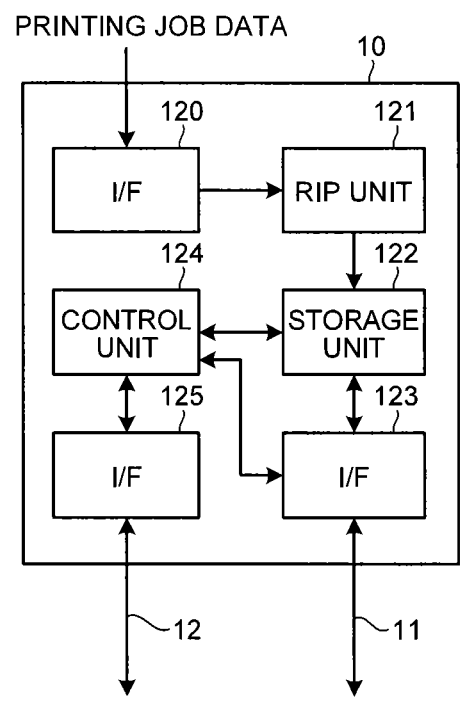
FIG. 2B is a functional block diagram of an example for explaining a function of the high level device which is applicable to an embodiment.

FIG. 2B is a functional block diagram of an example to explain a function of the high level device 10. The high level device 10 includes interfaces (I/F) 120, 123, and 125, an RIP unit 121, a storage unit 122, and a control unit 124. The interfaces 120, 123, and 125 correspond to the external I/F 110, the printing image data I/F 112, and the control information I/F 111 in FIG. 2A. The RIP unit 121 and the control unit 124 are configured by a program which operates on the CPU 101 in FIG. 2A. Further, the storage unit 122 corresponds to at least one of the RAM 103 and the HDD 104 in FIG. 2A.

Print job data including PDL data is created in the host device 5 and transmitted to the high level device 10. This print job data is received by the interface 120 and is supplied to the RIP unit 121. The RIP unit 121 performs rendering based on the PDL data included in the supplied print job data and creates printing image data by the bit map data of each of Y, C, M, and K colors. The RIP unit 121 sequentially stores the generated printing image data of Y, C, M, and K colors in the storage unit 122.

The control unit 124 communicates with the printer controller 14 of the printer device 13 through the interface 125. For example, the control unit 124 generates control information to control printing in the printer device 13 based on print job data supplied from the host device 5 through the interface 120. This control information is transmitted from the control unit 124 to the printer controller 14 through the interface 125.

Meanwhile, control information to control printing, for example, includes information concerning printing image data or information concerning a printing medium (printing paper) on which printing image data is printed. Information concerning printing image data includes information on a resolution and gradation of a printing image, a printing size, and number of pages. Information concerning printing paper includes information indicating whether printing paper is continuous forms paper or a cut sheet and information on paper conveyance. Information on paper conveyance, for example, includes information indicating a paper conveyance length (number of dots), a paper feed tray and a paper discharge tray, and information indicating a paper size.

The interface 123 is configured to be able to independently access each of printing image data of Y, C, M, and K colors which are stored in the storage unit 122. Further, the interface 123 is connected to the printer device 13 through a plurality of data lines 11 each corresponding to one of Y, C, M, and K colors and exchanges control information concerning transfer of printing image data of each of Y, C, M, and K colors or transfers printing image data of each of Y, C, M, and K colors to the printer device 13 through the plurality of data lines 11.

Printer Device

Figure 3A:
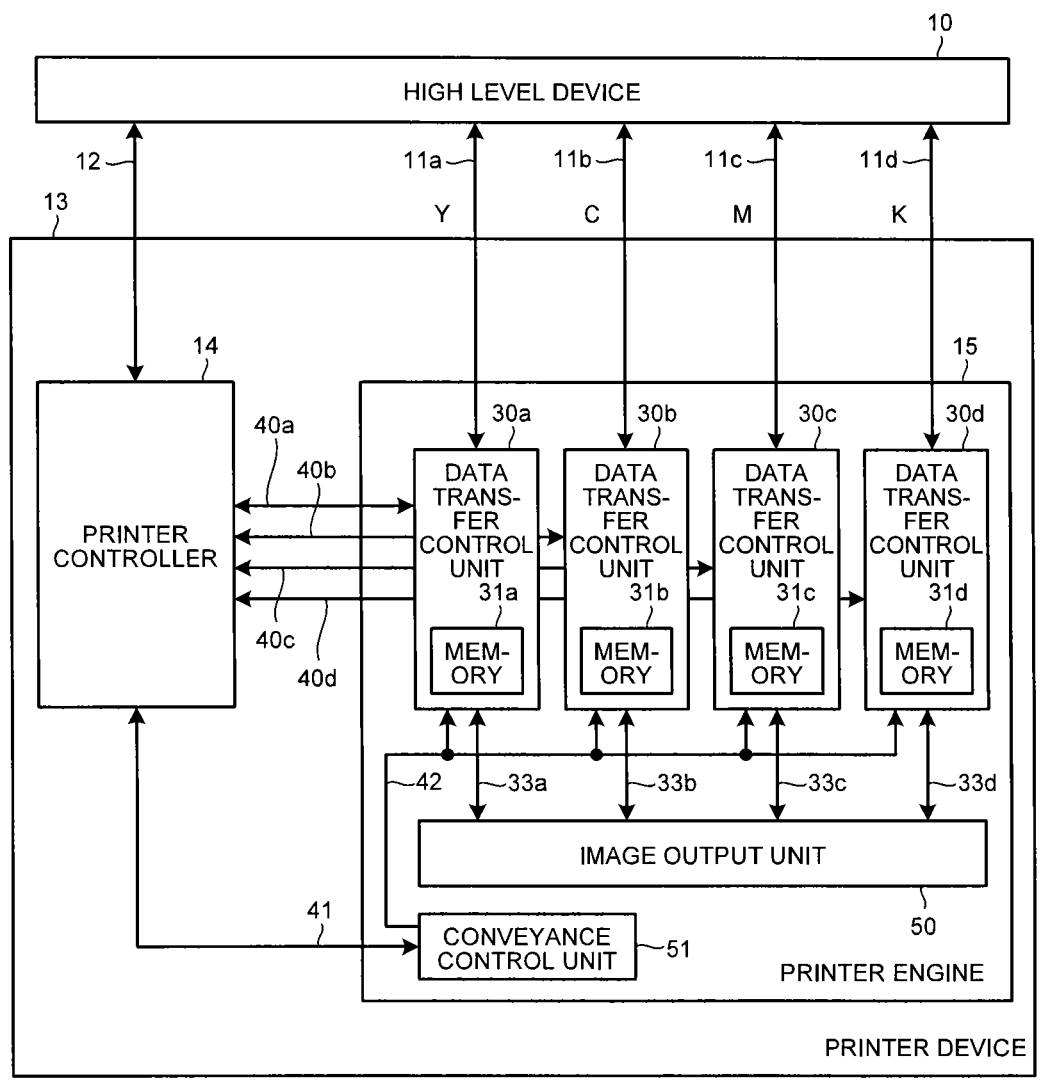
FIG. 3A is a block diagram illustrating an example of a basic configuration of a printer device which is applicable to an embodiment.

FIG. 3A illustrates an example of a basic configuration of the printer device 13 which is applicable to an embodiment. The printer device 13 includes the printer controller 14 and a printer engine 15. The printer controller 14 is connected to the control line 12 and transmits/receives control information to/from the high level device 10 through the control line 12 to control printing operation. The printer engine 15 is connected to the plurality of data lines 11a, 11b, 11c, and 11d and performs print processing based on printing image data for each color transferred from the high level device 10 through the data lines 11a, 11b, 11c, and 11d in accordance with control of the printer controller 14.

Figure 3B:
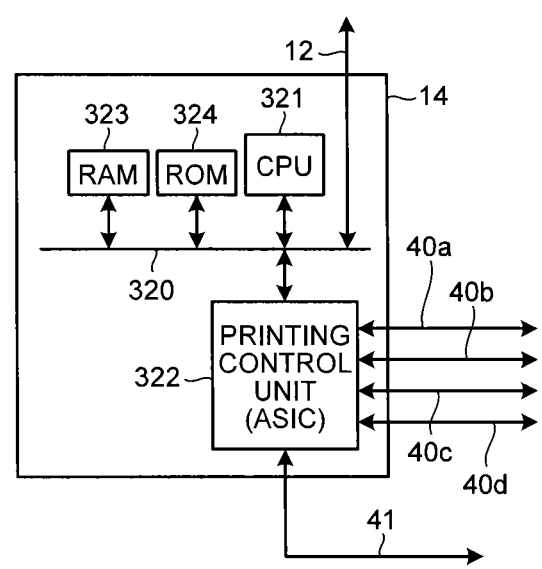
FIG. 3B is a block diagram illustrating a configuration of an example of a printer controller which is applicable to an embodiment.

The printer controller 14 and the printer engine 15 will be described in detail. FIG. 3B illustrates a configuration of an example of the printer controller 14. The printer controller 14 includes a CPU 321, a printing control unit 322, a RAM 323, and a ROM 324, and the CPU 321, the printing control unit 322, the RAM 323, and the ROM 324 are connected to a bus 320 so as to communicate with each other. A control line 12 is also connected to the bus 320 through a communication I/F which is not illustrated. The CPU 321 is operated by using the RAM 323 as working memory in accordance with a program stored in the ROM 324 and controls overall operation of the printer device 13.

The printing control unit 322, for example, is configured by an ASIC (application specific integrated circuit), and a micro processor, a plurality of DMACs (direct memory access controllers) and the like therein are connected by the bus so as to communicate with each other. The printing control unit 322 is connected with data transfer control units 30a, 30b, 30c, and 30d, which will be described later, by engine I/F control lines 40a, 40b, 40c, and 40d, respectively. The printing control unit 322 individually transmits/receives a control signal to/from the data transfer control units 30a, 30b, 30c, and 30d. Further, the printing control unit 322 is connected with a conveyance control unit 51, which will be described later, by an engine I/F control line 41 to transmit/receive a control signal to control conveyance of paper to/from the conveyance control unit 51.

Returning to FIG. 3A, the printer engine 15 has a plurality of data transfer control units 30a, 30b, 30c, and 30d each having the same configuration and includes an image output unit that performs image formation by outputting an image based on printing image data on printing paper.

The data transfer control units 30a, 30b, 30c, and 30d are connected to data lines 11a, 11b, 11c, and 11d. The data transfer control units 30a, 30b, 30c, and 30d include memories 31a, 31b, 31c, and 31d, respectively, and store printing image data for each color transferred from the high level device 10 through the data lines 11a, 11b, 11c, and 11d in the memories 31a, 31b, 31c, and 31d, respectively.

The memories 31a, 31b, 31c, and 31d have the same memory capacity and the same address configuration. Further, each of the memories 31a, 31b, 31c, and 31d preferably has a capacity capable of storing printing image data of at least three pages. Printing image data of three pages, for example, corresponds to printing image data of a page which is being transferred from the high level device 10, printing image data of a page which is currently being output, and printing image data of a next page. However, the present invention is not limited thereto, but each of the memories 31a, 31b, 31c, and 31d may be capable of storing printing image data of two pages or less.

The memories 31a, 31b, 31c, and 31d are collectively managed by the printer controller 14 using an input pointer and an output pointer. The input pointer indicates a leading address when image data is transferred to the memories 31a, 31b, 31c, and 31d. The output pointer indicates a leading address when image data is output from the memories 31a, 31b, 31c, and 31d. The details of collective management of the memories 31a, 31b, 31c, and 31d by the input pointer and the output pointer will be described later.

The data transfer control units 30a, 30b, 30c, and 30d are connected with the printer controller 14 by the engine I/F control lines 40a, 40b, 40c, and 40d, respectively. The printer controller 14 may individually transmit/receive a control signal to/from each of the data transfer control units 30a, 30b, 30c, and 30d through a corresponding one of the engine control lines 40a, 40b, 40c, and 40d. More specifically, the engine control lines 40a, 40b, 40c, and 40d are connected to the printing control unit 322 in the printer controller 14. The data transfer control units 30a, 30b, 30c, and 30d communicate with the printing control unit 322 through the engine I/F control lines 40a, 40b, 40c, and 40d.

The printer controller 14 and the conveyance control unit 51 that controls conveyance of printing paper are connected by the engine I/F control line 41 to perform communication between the printer controller 14 and the conveyance control unit 51. More specifically, the conveyance control unit 51 and the printing control unit 322 in the printer controller 14 are connected by the engine I/F control line 41 to perform communication between the conveyance control unit 51 and the printing control unit 322. Further, the conveyance control unit 51 is connected with the data transfer control units 30a to 30d by a signal line 42.

Figure 4A:
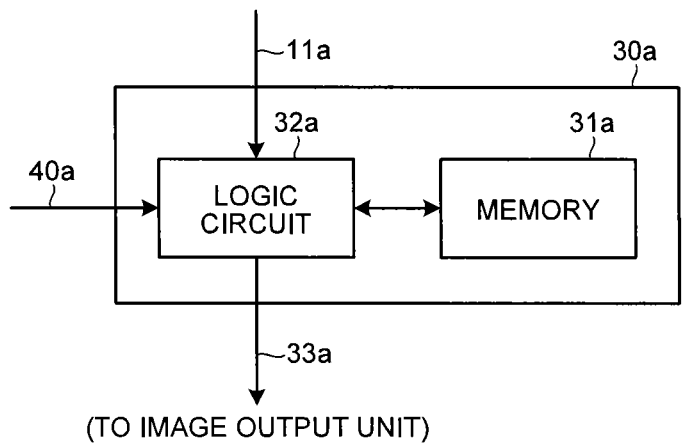
FIG. 4A is a block diagram schematically illustrating a configuration of an example of a data transfer control unit which is applicable to an embodiment.

FIG. 4A schematically illustrates a configuration of an example of the data transfer control unit 30a. Further, since a common configuration is applied to the data transfer control units 30a, 30b, 30c, and 30d, in FIG. 4A, a configuration of the data transfer control unit 30a will be illustrated as a representative of the data transfer control units 30a, 30b, 30c, and 30d.

The data transfer control unit 30a includes the memory 31a and a logic circuit 32a. The engine I/F control line 40a and the data line 11a are connected to the logic circuit 32a. The logic circuit 32a stores printing image data transferred from the high level device 10 through the data line 11a into the memory 31a in accordance with a control signal received from the printing control unit 322 through the engine I/F control line 40a. Similarly, the logic circuit 32a reads out printing image data from the memory 31a in accordance with a control signal received from the printing control unit 322 through the engine I/F control line 40a and supplies the printing image data to the image output unit 50 which will be described later through the output line 33a.

Control by the logic circuit 32a which is configured as hardware by combination of a logic element and so on provides an advantage of being able to be performed at a higher speed than control performed by a CPU in which processing is branched by an interrupt to a program. The logic circuit 32a, for example, performs logic analysis for a control signal consisting of a bit string which is received through the engine I/F control line 40a to determine processing to be performed. However, the present invention is not limited thereto, but a function equivalent to that of the logic circuit 32a may be implemented by way of software by using a CPU.

Printing image data for each color output from data transfer control units 30a, 30b, 30c, and 30d is supplied to the image output unit 50. The image output unit 50 performs printing based on the printing image data for each color. In this embodiment, printing based on printing image data is performed by an inkjet method which ejects an ink from a nozzle provided in a head to perform printing. Of course, a printing method is not limited to the inkjet method, but for example, a laser printer method that forms an electrostatic latent image on a photosensitive drum by a laser beam in accordance with image data and transfers a toner image obtained by developing the electrostatic latent image onto printing paper to form an image may be used.

Figure 4B:
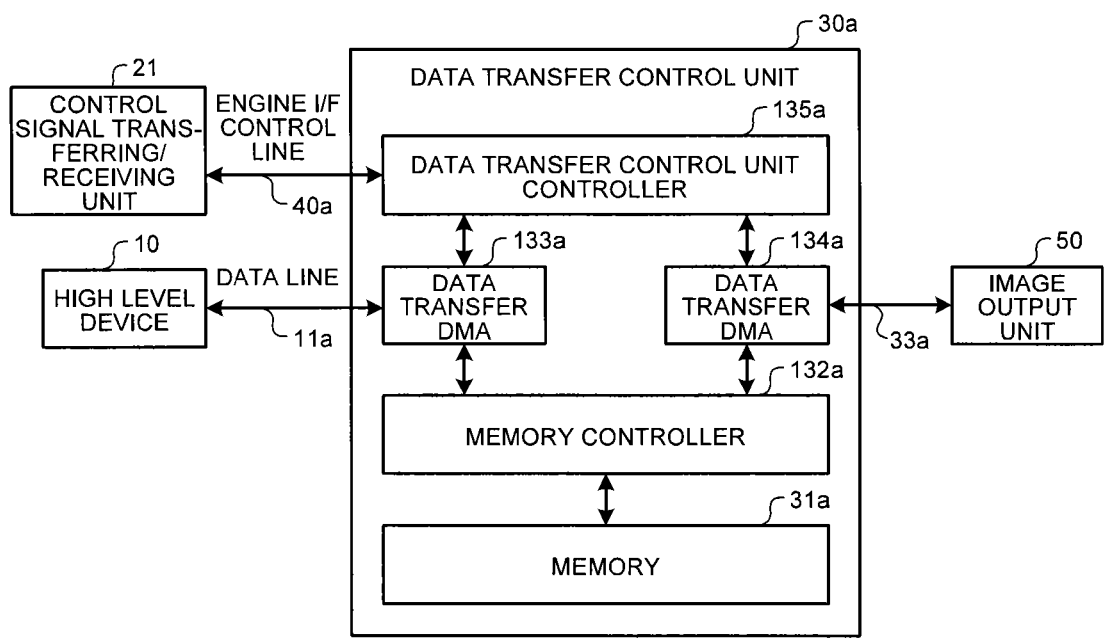
FIG. 4B is a block diagram illustrating a configuration of an example of a data transfer control unit which is applicable to an embodiment in more detail.

FIG. 4B illustrates a configuration of an example of the data transfer control unit 30a in detail. In FIG. 4B, the same reference numerals denote parts, which are common to FIG. 4A and are described above, and detailed description thereof will be omitted. The data transfer control unit 30a includes the memory 31a, a memory controller 132a, data transfer DMAs (direct memory access) 133a and 134a, and a data transfer control unit controller 135a. Among these, the memory controller 132a, the data transfer DMAs (direct memory access) 133a and 134a, and the data transfer control unit controller 135a are included in the logic circuit 32a in FIG. 4A.

The memory controller 132a controls access to the memory 31a. The data transfer DMA 133a receives printing image data from the high level device 10 and writes the printing image data in memory through the memory controller 132a. The data transfer DMA 134a reads out data from the memory 31a through the memory controller 132a and transfers the data to the image output unit 50 through the output line 33a. The data transfer control unit controller 135a receives control information which is transmitted from the printing control unit 322 of the printer controller 14 through the engine I/F control line 40a and controls the data transfer DMAs 133a and 134a in accordance with the received control information.

For example, if a request to start data transfer transmitted from the printing control unit 322 is received by the data transfer control unit controller 135a through the engine I/F control line 40a, the data transfer control unit controller 135a instructs the data transfer DMA 133a to start transferring data in accordance with the request. The data transfer DMA 133a transmits a data transfer request to the high level device 10 through the data line 11a in accordance with this instruction. Data transmitted from the high level device 10 in accordance with this request, for example, is received by the data transfer DMA 133a and written at a predetermined address in the memory 31a through the memory controller 132a.

If a printing instruction transmitted from the printing control unit 322 is received by the data transfer control unit controller 135a through the engine I/F control line 40a, the data transfer control unit controller 135a instructs the data transfer DMA 134a to read out data from the memory 31a. The data transfer DMA 134a reads out data from the memory 31a through the memory controller 132a in accordance with this instruction. The data transfer DMA 134a transfers the read data to the image output unit 50 through the output line 33a.

Figure 5:
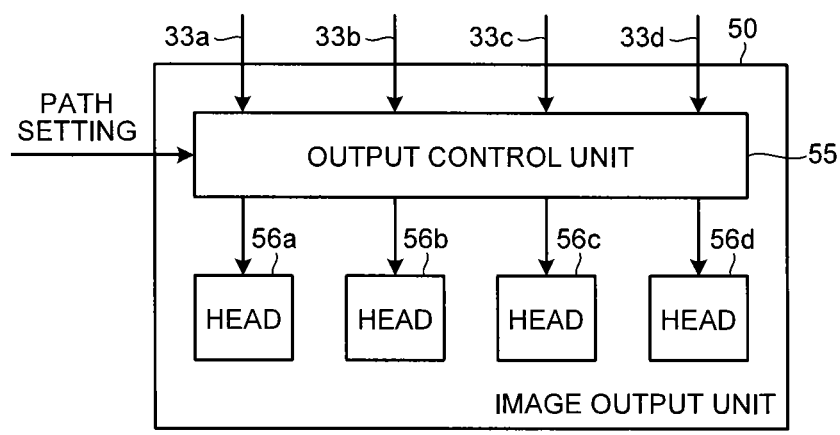
FIG. 5 is a block diagram illustrating a configuration of an example of an image output unit which is applicable to an embodiment.

FIG. 5 illustrates a configuration of an example of the image output unit 50. The image output unit 50 includes an output control unit 55 and heads 56a, 56b, 56c, and 56d for Y, C, M, and K colors, respectively. The relationship between the colors and the heads 56a, 56b, 56c, and 56d is not limited thereto. The output control unit 55 controls connection between the output lines 33a, 33b, 33c, and 33d through which printing image data of the data transfer control units 30a, 30b, 30c, and 30d are output and the heads 56a, 56b, 56c, and 56d. In other words, the output control unit 55 can set a path by selecting one from output lines 33a, 33b, 33c, and 33d to connect the selected one to one of the heads 56a, 56b, 56c, and 56d.

For example, the output control unit 55 may set the output lines 33a, 33b, 33c, and 33d and the heads 55a, 55b, 55c, and 55d so as to be connected one to one. Further, the output control unit 55 may set the output lines 33a, 33b, 33c, and 33d and the heads 56a, 56b, 56c, and 56d so as to be connected one to multiple, for example, by connecting the connection of the heads 56a, 56b, 56c, and 56d to the output line 33a.

A path that connects the output lines 33a, 33b, 33c, and 33d with the heads 56a, 56b, 56c, and 56d may be set by user operation, for example, using a DIP switch. However, the present invention is not limited thereto, but the path may be set by a control signal from the printing control unit 322.

Here, in the printer device 13 according to the embodiment, transfer of printing image data from the high level device 10 and transmission/reception of a control signal that controls printing based on the printing image data between the high level device 10 and the printer device 13 may be performed through different paths. Further, printing image data for respective colors are transferred from the high level device 10 through different data lines 11a, 11b, 11c, and 11d, and the printing image data for respective colors which are transferred through the data lines 11a, 11b, 11c, and 11d are independently controlled to be supplied to the data transfer control units 30a, 30b, 30c, and 30d having a common configuration. Further, in the image output unit 50, connection paths of the data transfer control units 30a, 30b, 30c, and 30d with the heads 56a, 56b, 56c, and 56d for respective colors may be set by the user manipulation.

In the printer device 13 according to the embodiment, a configuration of the printer engine 15 may be easily changed in accordance with number of colors (four colors of Y, C, M, and K, or only a color of K) of printing image data and number of heads used in the image output unit 50. At this time, only any of the data transfer control units 30a, 30b, 30c, and 30d that are considered to be necessary in accordance with a required configuration may be provided in the printer engine 15.

For example, when performing full color printing of four colors of colors Y, C, M, and K is required, all data transfer control units 30a, 30b, 30c, and 30d are provided in the printer engine 15, and the outputs of the data transfer control units 30a, 30b, 30c, and 30d may be connected to the heads 56a, 56b, 56c, and 56d in the output control unit 55, respectively.

Further, for example, when printing is performed with one color of a color K to give priority to a cost of a device, only one data transfer control unit 30a and one head 56a may be provided, and an output of the data transfer control unit 30a may be connected to the head 56a in the output control unit 55. Furthermore, for example, when printing is performed with one color of a color K to give priority to a printing speed, one data transfer control unit 30a and four heads 56a, 56b, 56c, and 56d may be provided, and an output of the data transfer control unit 30a may be connected to the heads 56a, 56b, 56c, and 56d in the output control unit 55. In this case, printing by the same color is repeated multiple times in an overlapping manner and it is conceivable, for example, to perform printing at a high speed by setting an ejecting time of ink from the heads 56a, 56b, 56c, and 56d to be a quarter of normal ejecting time and a conveyance speed of a printing paper to be four times normal conveyance speed.

Conveyance System when Printing Paper is Continuous Forms Paper

Referring to FIG. 3A, the conveyance control unit 51 is connected with the printing control unit 322 through the engine I/F control line 41 to control conveyance of paper on which an image is formed based on printing image data by the image output unit 50. In this embodiment, a configuration of the controller 14 is made common to a case when the printer device 13 has a conveyance system adapted to continuous forms paper and a case when the printer device 13 has a conveyance system adapted to a cut sheet.

Figure 6:
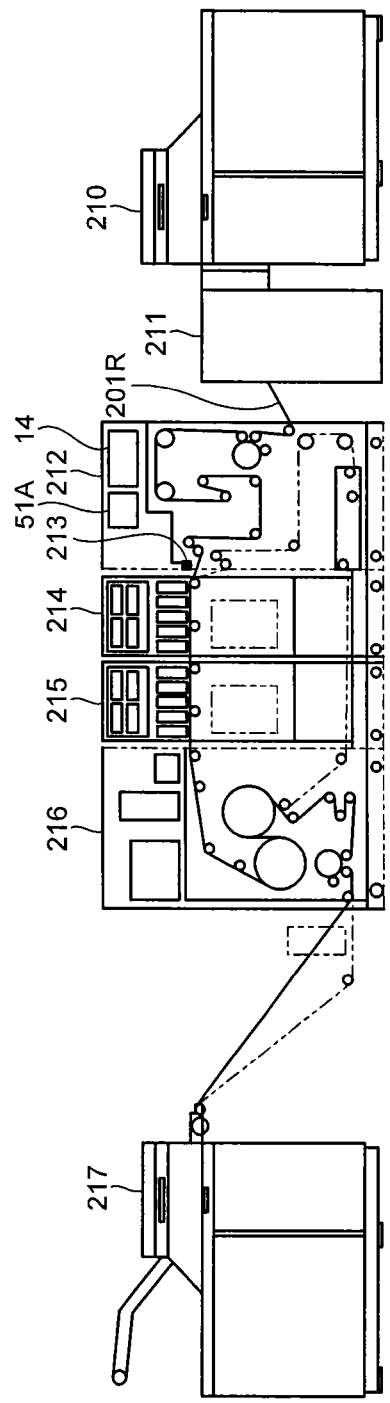
FIG. 6 is a schematic diagram schematically illustrating a structure of an example of a printer device including a conveyance system of a printing paper when the printing paper is continuous forms paper which is applicable to an embodiment.

FIG. 6 schematically illustrates a structure of an example of a printer device 200 including a conveyance system of printing paper when the printing paper is continuous forms paper which is applicable to the embodiment. Further, as a configuration of the printer device 200, a configuration of the printer device 13 which has been described referring to FIGS. 3A and 3B may be employed.

Printing paper 201R which is continuous forms paper is supplied from a printing paper supplying unit 210 to a first conveyance unit 212 through a power manipulating box 211. The printing paper 201R is conveyed through a plurality of rollers and/or the like by conveyance control of a continuous forms paper conveyance control unit 51A in the first conveyance unit 212, subjected to positioning and/or the like and then supplied to printer engine units 214 and 215 corresponding to the above-mentioned printer engine 15. Even though the details will be described later, the continuous forms paper conveyance control unit 51A corresponds to the above-mentioned conveyance control unit 51 having a configuration suitable to convey continuous forms paper.

The printer engine units 214 and 215 performs printing on the printing paper 201R supplied from the first conveyance unit 212 in accordance with printing image data in a printing unit 213 corresponding to the above-mentioned image output unit 50. The printing paper 201R on which printing is completed is discharged from the printer engine unit 215 and supplied to a second conveyance unit 216 by conveyance control of the continuous forms paper conveyance control unit 51A. The printed printing sheet 201R is conveyed in the second conveyance unit 216, discharged and then supplied to a cutting unit 217. The printed printing sheet 201R is cut along perforations by the cutting unit 217 to separate a page.

Here, since the printer device 200 performs printing on the printing paper 201R which is continuous forms paper having continuous pages, the printing paper 201R is always present in a path until the printing paper 201R is discharged from the second conveyance unit 216 after printing is performed on the printing paper 201R in the printer engine units 214 and 215.

Meanwhile, by preparing another set having a configuration similar to a set of the first conveyance unit 212, the printer engine units 214 and 215, and the second conveyance unit 216, it becomes possible to perform duplex printing on the printing paper 201R by reversing the front and back of the printed printing paper 201R discharged from the second conveyance unit 216 of the former set and supplying it to the first conveyance unit 212 of the latter set.

Figure 7:
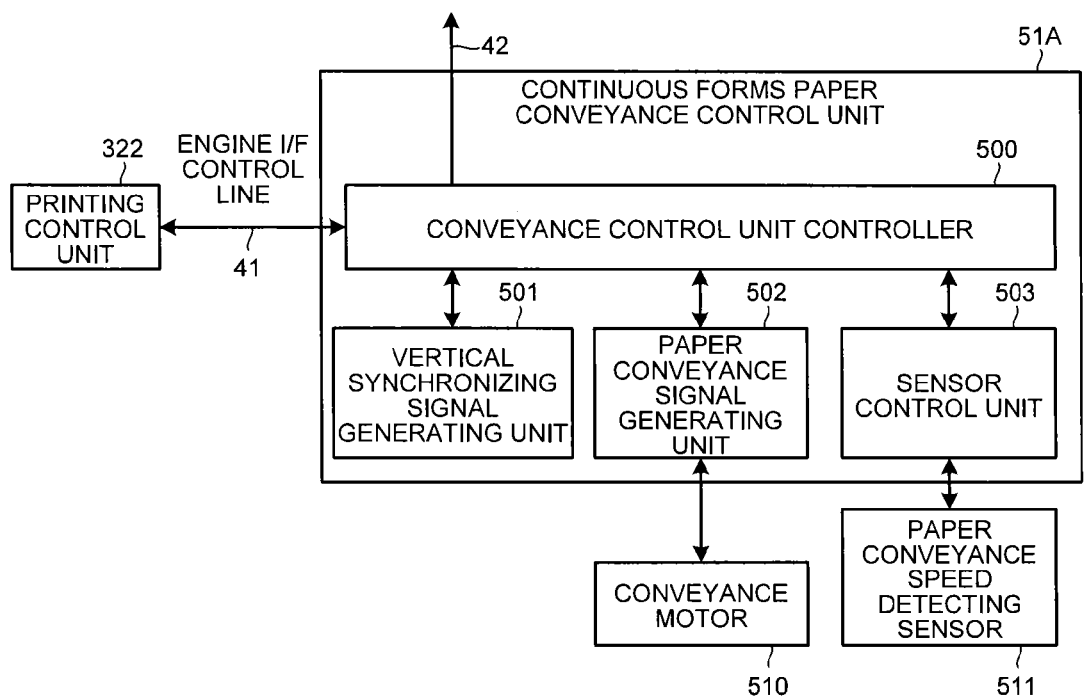
FIG. 7 is a block diagram illustrating a configuration of an example of a continuous forms paper conveyance control unit which is applicable to an embodiment.

FIG. 7 illustrates a configuration of an example of the continuous forms paper conveyance control unit 51A. The continuous forms paper conveyance control unit 51A includes a conveyance control unit controller 500, a vertical synchronizing signal generating unit 501, a paper conveyance signal generating unit 502, and a sensor control unit 503.

The conveyance control unit controller 500 is connected with the printing control unit 322 through an engine I/F control line 41 and receives a command and a setting information table transmitted from the printing control unit 322. The setting information table will be described in detail later. The received setting information table, for example, is stored in a memory, which is not illustrated, of the continuous forms paper conveyance control unit 51A. The conveyance control unit controller 500 analyzes the received setting information table and extracts information required to convey the printing paper 201R which is continuous forms paper. The conveyance control unit controller 500 controls conveyance of the printing paper 201R in accordance with the information extracted from the setting information table.

Further, the conveyance control unit controller 500 is connected to data transfer control units 30a to 30d through a signal line 42 and transmits a printable state report which will be described later to the data transfer control units 30a to 30d.

The vertical synchronizing signal generating unit 501 generates a vertical synchronizing signal which becomes a reference when conveyance timing is controlled. The paper conveyance signal generating unit 502 generates a paper conveyance instructing signal that controls drive of a conveyance motor 510 that drives a roller, that conveys printing paper, and/or the like in accordance with control of the conveyance control unit controller 500. The sensor control unit 503 detects a conveyance speed of printing paper based on an output of a paper conveyance speed detecting sensor 511.

Figure 8:
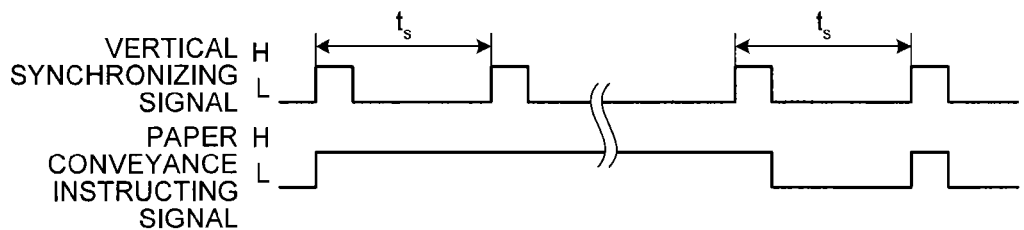
FIG. 8 is a schematic diagram for explaining paper conveyance control of continuous forms paper which is applicable to an embodiment.

Referring to FIG. 8, paper conveyance control of continuous forms paper will be described. For the paper conveyance control of continuous forms paper, a vertical synchronizing signal formed of a pulse having a constant cycle $t_s$ and a paper conveyance instructing signal are used. The vertical synchronizing signal is generated by the vertical synchronizing signal generating unit 501 and supplied to the conveyance control unit controller 500.

The vertical synchronizing signal is always generated at the constant cycle $t_s$, for example, while the printer engine 15 is running. The cycle $t_s$ of the vertical synchronizing signal is equal to time during which printing paper is conveyed by a reference length in a printing operation.

The paper conveyance instructing signal of any of a high level H that instructs to convey the paper and a low level L that instructs to stop conveying the paper is output in synchronization with the vertical synchronizing signal in accordance with control of the conveyance control unit controller 500. The paper conveyance signal generating unit 502 drives the conveyance motor 510 by the paper conveyance instructing signal of the high level and stops driving the conveyance motor 510 by the signal of the low level. By doing this, an amount of paper to be conveyed in a printing operation is controlled.

Paper conveyance control in printing operation will be described using an example in which the cycle $t_s$ of the vertical synchronizing signal is equal to time during which printing paper is conveyed by a length of ⅙ inches, and printing paper is conveyed by a length of 11 inches to covey the printing paper for a length corresponding to one page. First, in the continuous forms paper conveyance control unit 51A, the paper conveyance instructing signal at the high level starts to be transmitted and the pulse number of the vertical synchronizing signal starts to be counted in synchronization with the vertical synchronizing signal. The continuous forms paper conveyance control unit 51A controls an amount of paper to be conveyed based on this count value.

The amount M of paper to be conveyed can be calculated by following Equation (1) when the pulse number of vertical synchronizing signal is a value $P_v$ and the amount of paper to be conveyed corresponding to a cycle $t_s$ of the vertical synchronizing signal is a value $M_{ts}$.

$$M = P_v \times M_{ts} \tag{1}$$

From Equation (1), the pulse number $P_V$ of the vertical synchronizing signal when one page of paper having a length of 11 inches is conveyed can be calculated as following Equation (2).

$$P_v = M/M_{ts} = (11 \text{ inches})/(⅙ \text{ inches}) = 66 \tag{2}$$

Therefore, the continuous forms paper conveyance control unit 51A counts pulse number of the vertical synchronizing signal and sets the paper conveyance instructing signal to the low level when a count value becomes "66".

Conveyance System when Printing Paper is Cut Sheet

Figure 9:
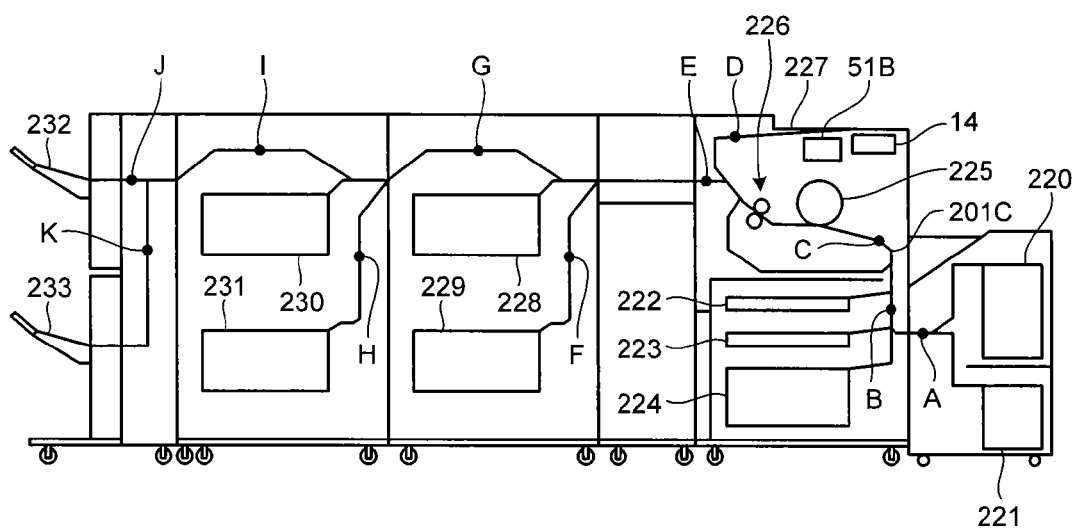
FIG. 9 is a schematic diagram schematically illustrating a structure of an example of a printer device including a conveyance system of a printing paper when the printing paper is a cut sheet which is applicable to the embodiment.

FIG. 9 schematically illustrates a structure of an example of a printer device 200' including a conveyance system of a printing paper when the printing paper is a cut sheet which is applicable to the embodiment. The printer device 200', for example, is a laser printer, and forms an electrostatic latent image by scanning in a main scan direction a photosensitive drum in a printing unit 225 with a laser beam emitted from a light source unit which is not illustrated in accordance with image data to develop the electrostatic latent image in a developing unit in the printing unit 225 to obtain a toner image and to transfer the toner image onto a printing paper 201C that is a cut sheet to from an image by the image data on the printing paper 201C. Further, as a configuration of the printer device 200', a configuration of the printer device 13 which has been described with reference to FIGS. 3A and 3B may be employed. The printer device 200' may use an ink jet method.

In FIG. 9, the printer device 200' includes a plurality of paper feed trays (hoppers) 220 to 224 and a plurality of paper discharge trays (stackers) 227 to 233. The paper feed trays 220 to 224 and the paper discharge trays 227 to 233 may store different sizes of printing papers 201C. Further, even though the details will be described later, a cut sheet conveyance control unit 51B corresponds to the above-mentioned conveyance control unit 51 having a configuration suitable to convey a cut sheet.

In printing operation, the printing paper 201C which is picked from the paper feed trays 220 to 224 passes through any of paper feeding paths A and B and further passes through a path C to be conveyed to the printing unit 225. On the printing paper 201C onto which a toner image is transferred by the printing unit 225, the toner image is fixed by a fixing unit 226 to form an image in accordance with a printing image data, and the printing paper 201C is sent to the paper discharging path E or D. The printing paper 201C which is sent to the paper discharging path D is discharged to the paper discharge tray 227.

The printing paper 201C which is sent to the paper discharging path E is sent to any one of the paper discharging paths F and G or discharged to the paper discharge tray 228. When the printing paper 201C is sent to the paper discharging path F, the printing paper 201C is discharged to the paper discharge tray 229. When the printing paper 201C is sent to the paper discharging path G, the printing paper 201C is sent to any one of paper discharging paths H and I or discharged to the paper discharge tray 230. When the printing paper 201C is sent to the discharging path H, the printing paper 201C is discharged to the paper discharge tray 231. When the printing paper 201C is sent to the paper discharging path I, the printing paper 201C is sent to any one of paper discharging paths J and K and discharged to any one of paper discharge trays 232 and 233.

These selection to pick the printing paper 201C from any one of the paper feed trays 220 to 224 and selection to discharge the printing paper 201C after forming the image to any one of the paper discharge trays 227 to 233 are controlled by the cut sheet conveyance control unit 51B based on information stored in a setting information table which will be described later.

Figure 10:
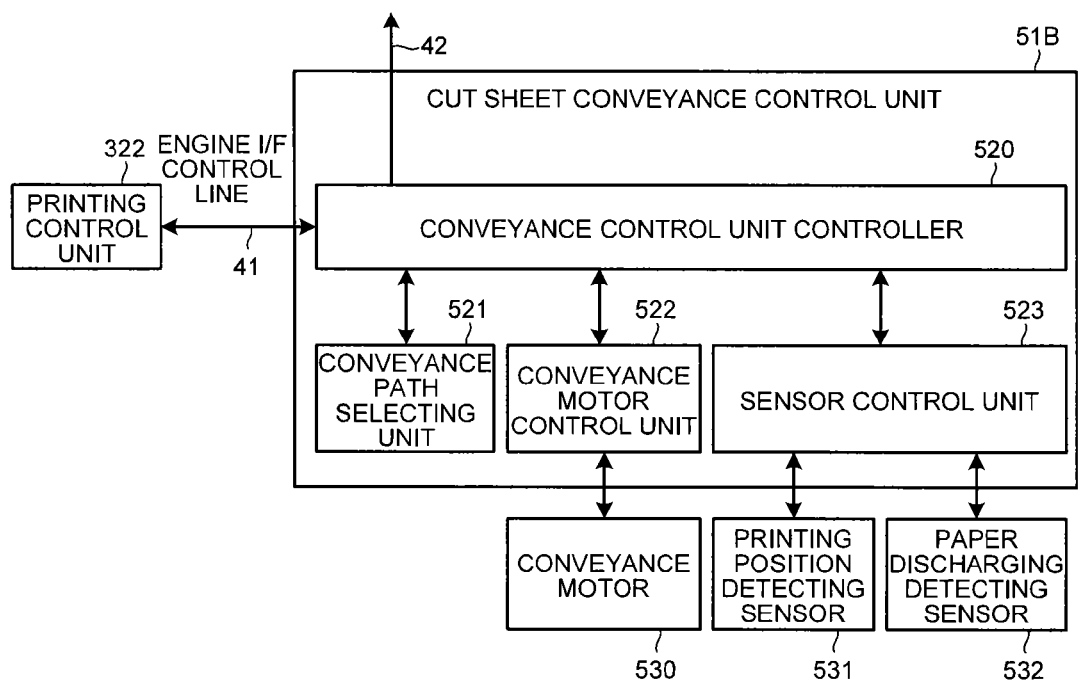
FIG. 10 is a block diagram illustrating a configuration of an example of a cut sheet conveyance control unit which is applicable to an embodiment.

FIG. 10 illustrates a configuration of an example of the cut sheet conveyance control unit 51B. The cut sheet conveyance control unit 51B includes a conveyance control unit controller 520, a conveyance path selecting unit 521, a conveyance motor control unit 522, and a sensor control unit 523.

The conveyance control unit controller 520 is connected to the printing control unit 322 through the engine I/F control line 41 and receives a command transmitted from the printing control unit 322 and a setting information table which will be described in detail later. The received setting information table, for example, is stored in a memory of the cut sheet conveyance control unit 51B which is not illustrated. The conveyance control unit controller 520 analyzes the received setting information table and extracts information required to convey the printing paper 201C which is a cut sheet. The conveyance control unit controller 520 controls a conveyance timing or a conveyance path of the printing paper 201C in accordance with the information stored in the register.

Further, the conveyance control unit controller 520 is connected to data transfer control units 30*a* to 30*d* through the signal line 42 and transmits a printable state report which will be described later to the data transfer control units 30*a* to 30*d*.

The conveyance path selecting unit 521 selects a conveyance path of the printing paper 201C based on an analysis result of a setting information table by the conveyance control unit controller 520. In addition, the conveyance path selecting unit 521 selects to pick the printing paper 201C from any one of the paper feed trays 220 to 224 and to discharge the printing paper 201C to any one of paper discharge trays 227 to 233. A selecting result is sent to the conveyance control unit controller 520.

The conveyance motor control unit 522 controls drive of a conveyance motor 530 that drives a roller that conveys the printing paper 201C in accordance with an instruction of the conveyance control unit controller 520. Further, the conveyance motor control unit 522 controls a path selecting mechanism which is not illustrated to convey the printing paper 201C through a path based determined based on a selecting result by the conveyance path selecting unit 521 regarding the paper feed trays 220 to 224 and the paper discharge trays 227 to 233.

The sensor control unit 523 detects that the printing paper 201C reaches a printing position (printing unit 225) based on an output of a printing position detecting sensor 531 and also detects that the printing paper 201C is discharged to the discharge tray based on an output of a paper discharging detecting sensor 532. These detecting results are sent to the conveyance control unit controller 520.

Next, conveyance control of the printing paper 201C that is a cut sheet will be roughly described. Paper conveyance control of the printer device 200' that uses a cut sheet is significantly different from the above-mentioned paper conveyance control of the printer device 200 that uses continuous forms paper. In the printer device 200', conveyance of the printing paper 201C is mainly controlled by a command or data communication by software of the printer controller 14 and the printer engine 15.

Figure 11:
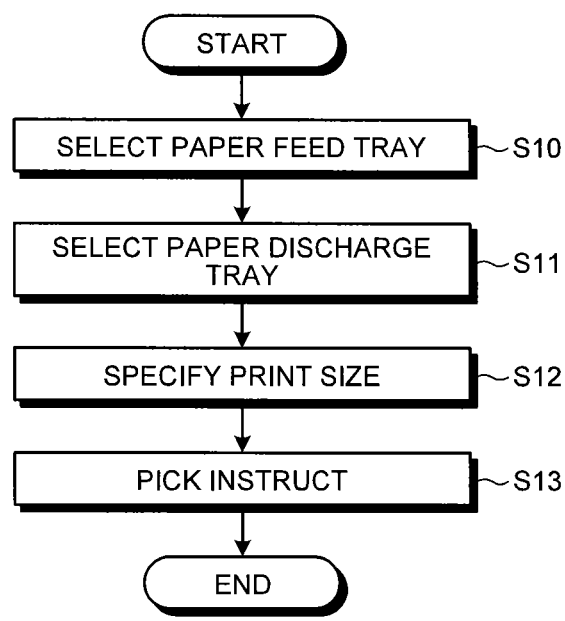
FIG. 11 is a flowchart of an example schematically illustrating conveyance control of a cut sheet which is applicable to an embodiment.

FIG. 11 is a flowchart of an example schematically illustrating conveyance control of a cut sheet. In FIG. 11, necessary minimum processing of the conveyance control is illustrated. First, the CPU 321 in the printer controller 14 selects a paper feed tray in a step S10 and selects a paper discharge tray in a next step S11 in accordance with operation of a program. Further, the CPU 321 specifies a printing size in a next step S12 in accordance with operation of a program. Here, the printing size indicates a size (A4, B4 or the like) of the printing paper 201C.

The setting contents set in the steps S10 to step S12 is written in a setting information table and transmitted from the printing control unit 322 to the cut sheet conveyance control unit 51B.

The setting information table is received by the conveyance control unit controller 520 in the cut sheet conveyance control unit 51B. The conveyance control unit controller 520 analyzes the received setting information table and creates picking instruction based on a paper feed tray, a paper discharge tray, and a printing size (step S13). The picking instruction is sent to the conveyance path selecting unit 521. The conveyance path selecting unit 521 selects any one of the paper feed trays 220 to 224 and any one of the paper discharge trays 227 to 233 to be used in the printer device 200' based on the received picking instruction. This selecting result is sent to the conveyance control unit controller 520. The conveyance control unit controller 520 controls the conveyance motor control unit 522 based on the selecting result to drive the conveyance motor 530 to convey the printing paper 201C.

Hereinafter, if the printing paper 201R which is continuous forms paper and the printing paper 201C which is a cut sheet are not discriminated, the printing papers 201R and 201C are described as a printing paper 201.

Details of Print Processing which is Applicable to the Embodiment

Next, print processing which is applicable to the embodiment will be described in detail. FIG. 12 illustrates an example of control information which is transmitted and received between the high level device 10 and the printer controller 14 of the printer device 13 through the control line 12. In FIG. 12, the high level device 10 and the printer controller 14 are illustrated as a DFE (digital front end processor) and a PCTL, respectively. The control information generally includes (1) job (JOB) information, (2) information indicating a printer status and a printing process, (3) information indicating a printing condition, and (4) information indicating connection.

The job information of (1) notifies a job (JOB) start and job completion. The job start includes a notification of a job start from the high level device 10 to the printer controller 14 and a response to the notification from the printer device 13 to the high level device 10. The job completion includes a notification of completion of all printing processes requested by a job start from the high level device 10 to the printer controller 14 and a response to the notification from the printer controller 14 to the high level device 10. At the time of responses in the job start and the job completion, a job identifier (JOBID) that identifies a job is transmitted from the printer controller 14 to the high level device 10.

The information indicating the printer status and the printing process of (2) notifies a printing process reception start, a request and a notification of printer information, a printing process start, a printing process request, data transfer completion, data reception completion, printing process completion, process status report, a SC (service control) notification, error occurrence and removal.

The printing process reception start notifies from the printer device 13 to the high level device 10 that the printer controller 14 is ready to receive the printing process. The request and notification of printer information includes a request of necessary printer information from the high level device 10 to the printer controller 14 and a response to the request from the printer controller 14 to the high level device 10.

The printing process start includes a notification from the high level device 10 to the printer controller 14 that preparation of printing image data is completed and a response to the notification from the printer device 13 to the high level device 10. The notification of preparation completion of printing image data is performed in order of outputting printing image data and in units of a page (a process). The page refers to a printing unit in which printing is performed by a series of printing operations.

The printing process request includes a notification of a printing process from the printer controller 14 to the high level device 10 and a response to the notification from the high level device 10 to the printer controller 14. The printer controller 14 notifies color information (yellow, cyan, magenta or black) indicating a color of any of Y, C, M, and K by which the printing is performed, a process identification number process ID, and a plane identification number to the high level device 10 by the printing process request. A plane corresponds to an image based on printing image data for each color to be printed in one page. The printer controller 14 notifies these pieces of the information in units of a plane and in order of request of the engines, that is, the data transfer control units 30a, 30b, 30c, and 30d. In other words, the printer engine 15 takes printing image data consisting of bit map data from the high level device 10.

In the data transfer completion, transfer completion of requested plane printing image data is notified from the high level device 10 to the printer controller 14. In the data reception completion, reception completion of requested plane printing image data is notified from the printer controller 14 to the high level device 10. In the printing process completion, completion of requested printing for all pages (process) is notified from the high level device 10 to the printer controller 14. In the process status report, the printing status of a page (process) is notified from the printer controller 14 to the high level device 10. At this time, the printer controller 14 obtains information concerning paper feeding, paper discharging, and print starting, from the printer engine 15, and adds these obtained pieces of information to the notification to be transmitted to the high level device 10.

In the SC notification, failure information of the printer device 13 is requested to obtain from the high level device 10 to the printer controller 14 and the failure information obtained in response to the request is notified from the printer controller 14 to the high level device 10. As for the error occurrence and removal, occurrence and removal of an error at the high level device 10 is notified from the high level device 10 to the printer controller 14.

The information indicating a printing condition of (3) includes a setting of a printing condition, that is, a notification of the printing condition from the high level device 10 to the printer controller 14 and a response to the notification of the printer controller 14. Examples of a printing condition include a printing form, a printing kind, paper feeding/discharging information, order of surfaces to be printed, a kind of printing paper, a printing paper size, a printing data size, a resolution, a gradation, and color information.

The printing form indicates which printing type among duplex printing and single sided printing is performed on the printing paper 201. The printing kind indicates whether there is printing image data to be printed or there is no printing image data to make an empty page. The paper feeding and discharging information indicates identification information of stackers or the like that are a feeding source and a discharging destination of the printing paper 201. The order of surfaces to be printed indicates order of a front surface to a rear surface of the printing paper 201 or order of a rear surface to a front surface in which printing is to be performed.

The kind of printing paper indicates which of the printing paper 201R that is continuous forms paper and the printing paper 201C that is a cut sheet is used. The printing paper size indicates a length of a page to be printed in a conveyance direction of the printing paper 201R if the printing paper 201R that is continuous forms paper is used. Further, if the printing paper 201C that is a cut sheet is used, the printing paper size indicates a size of one sheet of the printing paper 201C such as A4 or B4.

The printing data size indicates a data size of printing image data. In other words, the printing data size indicates a size of printing image data of one page. The resolution and the gradation indicate resolution and gradation when printing image data is printed on the printing paper 201. Further, the color information indicates whether to perform printing with a full color using the colors Y, C, M, and K or perform printing with a single color or using only a color K.

Information indicating connection of (4) includes registration and release, and, in both the high level device 10 and the printer controller 14, registration of information on each other and release of the registered information are performed.

Printing Sequence

Figure 13:
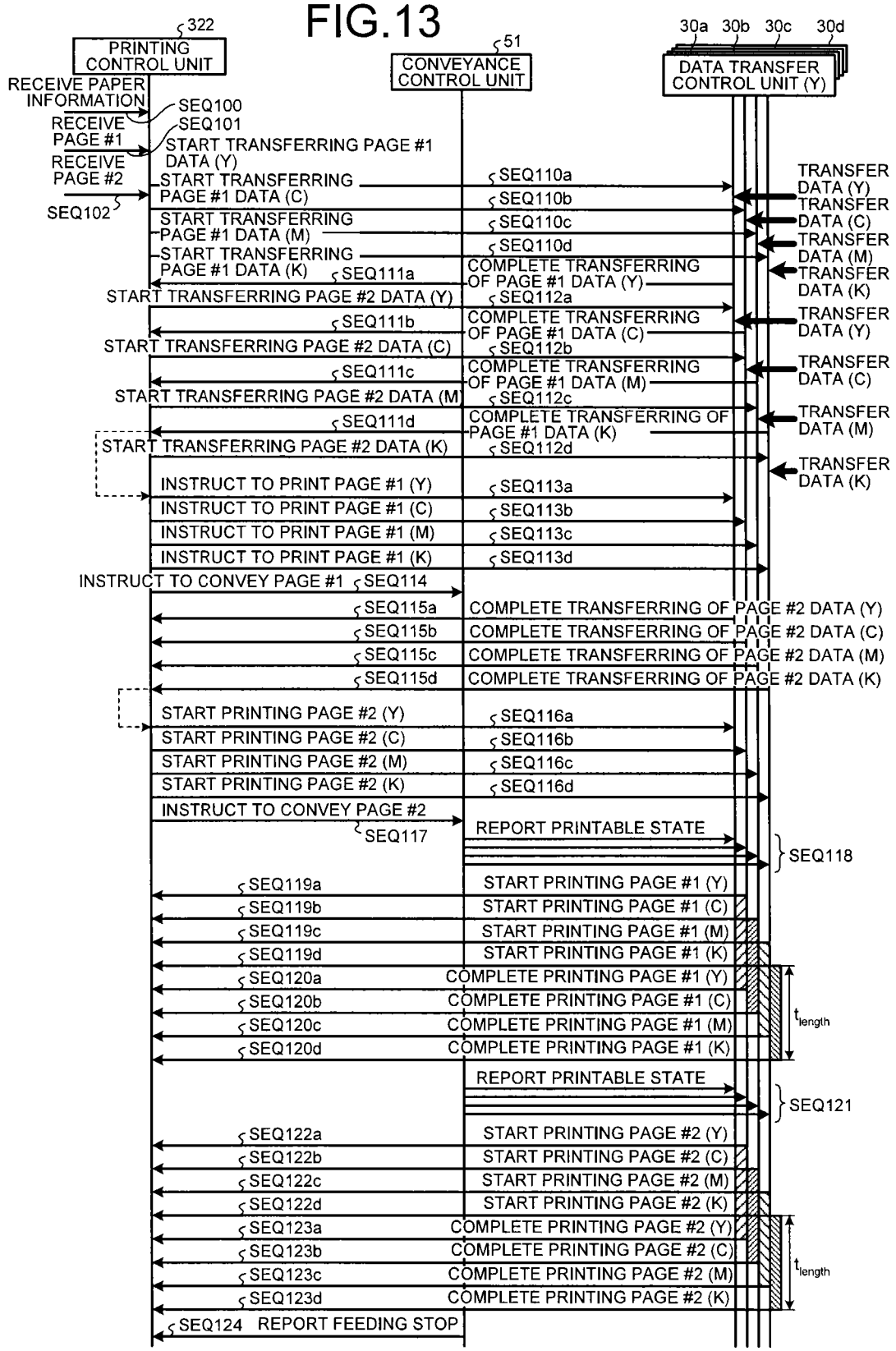
FIG. 13 is a sequence diagram of an example schematically illustrating a print processing according to an embodiment.

Next, print processing according to the embodiment will be described. FIG. 13 is a sequence diagram of an example schematically illustrating print processing according to the embodiment. Here, the printer device 13 performs full color printing using colors Y, C, M, and K. Further, print processing according to the sequence diagram illustrated in FIG. 13 can be applied to any of the printer device 200 having the printing paper 201R which is continuous forms paper as a printing target and the printer device 200' having the printing paper 201C which is a cut sheet as a printing target. Hereinafter, if there is no specific description, the printing paper 201R and the printing paper 201C may be represented by the printing paper 201.

In the printer controller 14, the printing control unit 322 receives information concerning the printing paper 201 as control information from the high level device 10 (SEQ100). Further, the printing control unit 322 receives control information (page control information) indicating a job start of a first page (page #1) from the high level device 10 (SEQ101). The printing control unit 322 creates a setting information table of the first page (which will be described later) based on the control information received in SEQ101 and paper information received in SEQ100. The printing control unit 322 transmits the created setting information table to the data transfer control units 30*a*, 30*b*, 30*c*, and 30*d* and requests to start transferring a page identifier indicating the first page and data of a page indicated by the page identifier for the colors Y, C, M, and K (SEQ110*a*, 110*b*, 110*c*, and 110*d*).

The data transfer control units 30*a*, 30*b*, 30*c*, and 30*d* take out required information from the setting information table transmitted from the printing control unit 322, and request printing image data of the first page of respective colors (Y, C, M, and K) from the high level device 10 through the respective data lines 11*a*, 11*b*, 11*c*, and 11*d* based on the taken information. The data transfer control units 30*a*, 30*b*, 30*c*, and 30*d* stores the printing image data of the first page of the respective colors (Y, C, M, and K) transferred from the high level device 10 in the respective memories 31*a*, 31*b*, 31*c*, and 31*d* in response to this request.

However, in the example of FIG. 13, while the data of the first page is requested to be transferred from the printing control unit 322 to the data transfer control units 30*a*, 30*b*, 30*c*, and 30*d*, the printing control unit 322 receives control information indicating a job start for next second page transmitted from the high level device 10 (SEQ102). The printing control unit 322 creates a setting information table for the second page based on the received control information and stores the setting information table in, for example, the RAM 323.

When transfer of the printing image data of the first page of each color from the high level device 10 is completed, the data transfer control units 30*a*, 30*b*, 30*c*, and 30*d* notify this to the printing control unit 322 (SEQ111*a*, 111*b*, 111*c*, and 111*d*). The printing control unit 322 transmits the setting information table of the second page to the data transfer control units 30*a*, 30*b*, 30*c*, and 30*d* in response to this notification to request to start transferring the data of the second page (page #2) (SEQ112*a*, 112*b*, 112*c*, and 112*d*).

The data transfer control units 30*a*, 30*b*, 30*c*, and 30*d* receive the setting information table from the printing control unit 322 and takes out necessary information. The data transfer control units 30*a*, 30*b*, 30*c*, and 30*d* request the printing image data of the second page of respective colors to the high level device 10 based on the taken information and store the printing image data of the second page of respective colors transferred from the high level device 10 in response to this request in the respective memories 31*a*, 31*b*, 31*c*, and 31*d*.

The data transfer control units 30*a*, 30*b*, 30*c*, and 30*d* can notice completion of data transfer based on an amount of transferred printing image data. For example, the high level device 10 may transmit information indicating an amount of printing image data of one page by adding it to a head of printing image data at the time of starting transferring the data to the data transfer control units 30*a*, 30*b*, 30*c*, and 30*d*. Further, when the printing image data is transferred every predetermined unit, the high level device 10 may add completion information indicating completion of transferring one page to final piece of printing image data in units of the transferring unit in one page. Further, the high level device 10 may transmit information indicating completion of transferring printing image data of one page to the data transfer control units 30*a*, 30*b*, 30*c*, and 30*d* separately from the printing image data, for example, immediately after transferring the printing image data of one page.

Meanwhile, if notification of completion of transferring data of the first page is received from all of the data transfer control units 30*a*, 30*b*, 30*c*, and 30*d*, the printing control unit 322 instructs data transfer control units 30*a*, 30*b*, 30*c*, and 30*d* to start printing the first page (SEQ113*a* to 113*d*). Together with this, the printing control unit 322 transmits a setting information table which will be described later to the conveyance control unit 51 and instructs to convey the printing paper 201 of the first page (SEQ114). The conveyance control unit 51 starts conveying the printing paper 201 in response to this instruction.

In a case of the printer device 200 in which the printing target is the printing paper 201R of continuous forms paper, the printing control unit 322 transmits a setting information table to the continuous forms paper conveyance control unit 51A. In the continuous forms paper conveyance control unit 51A, the setting information table is received by the conveyance control unit controller 500, and information which is required to convey the printing paper 201R such as a paper conveyance rate is taken out. In addition, the conveyance control unit controller 500 controls the paper conveyance signal generating unit 502 to generate the paper conveyance instructing signal at the high level. The conveyance motor 510 is driven in accordance with the paper conveyance instructing signal generated in the paper conveyance signal generating unit 502 and conveyance of the printing paper 201R is started.

In the continuous forms paper conveyance control unit 51A, when the sensor control unit 503 detects that a conveyance speed of the printing paper 201R reaches a defined value for printing based on an output of the paper conveyance speed detecting sensor 511, the sensor control unit 503 judges that a printable state is reached and notifies this to the conveyance control unit controller 500. The conveyance control unit controller 500 transmits a printable state report in SEQ118 which will be described later to the data transfer control units 30*a*, 30*b*, 30*c*, and 30*d* through the signal line 42 in response to this notification and counts pulse number of the vertical synchronizing signal which is generated by the vertical synchronizing signal generating unit 501.

Meanwhile, in a case of the printer device 200' in which the printing target is the printing paper 201C of a cut sheet, similarly to the above, the printing control unit 322 transmits a setting information table to the cut sheet conveyance control unit 51B. In the cut sheet conveyance control unit 51B, the setting information table is received by the conveyance control unit controller 520, and information which is required to convey the printing paper 201C such as paper conveyance tray selecting information or paper discharge tray selecting information is taken out. For example, the conveyance path selecting unit 521 selects a conveyance path based on the paper feed tray selecting information and the paper discharge tray selecting information. In addition, the conveyance control unit controller 520 controls the conveyance motor control unit 522 to start pick operation to take one sheet of printing paper 201C from a paper feed tray selected by the conveyance path selecting unit 521 and convey it through the selected path.

In the cut sheet conveyance control unit 51B, when the sensor control unit 523 detects that a position of the printing paper 201C reaches a predetermined printing position by a detection result of the printing position detecting sensor 531, the sensor control unit 523 notifies this to the conveyance control unit controller 520. The conveyance control unit controller 520 judges that a printable state is reached in accordance with this notification and transmits a printable state report in SEQ118, which will be described later, to the data transfer control units 30a, 30b, 30c, and 30d through the signal line 42.

If transfer of printing image data of respective colors of the second page which is started in the above-mentioned SEQ112a to 112d is completed, the data transfer control units 30a, 30b, 30c, and 30d notify this to the printing control unit 322 (SEQ115a to 115d). The printing control unit 322 instructs the data transfer control units 30a, 30b, 30c, and 30d to start printing the second page in response to this notification of completion of transferring the data (SEQ116a to 116d).

Further, when transfer of the printing image data of the colors of the second page is completed, the printing control unit 322 transmits the setting information table of the second page to the conveyance control unit 51 and instructs to convey the printing paper 201 of the second page (SEQ117).

Here, as described above, when it is judged that a printable state is reached, the conveyance control unit 51 transmits a printable state report to the data transfer control units 30a, 30b, 30c, and 30d through the signal line 42 in SEQ118. If the printable state report is received, the data transfer control units 30a, 30b, 30c, and 30d start printing the first page and notify this to the printing control unit 322 (SEQ119a to 119d). After starting the printing, each of the data transfer control units 30a, 30b, 30c, and 30d prints one page in a time $t_{length}$ and when the printing is completed, notifies this to the printing control unit 322 (SEQ120a to 120d).

Meanwhile, after transmitting the printable state report in the above-mentioned SEQ118, the conveyance control unit 51 monitors conveyance of the printing paper 201, and judges whether to complete conveyance of one page.

For example, in the printer device 200 in which the printing target is the printing paper 201R of continuous forms paper, the continuous forms paper conveyance control unit 51A counts pulse number of the vertical synchronizing signal generated by the vertical synchronizing signal generating unit 501. When a count value reaches the pulse number $P_v$ corresponding to an amount M of paper to be conveyed corresponding to one page, the continuous forms paper conveyance control unit 51A judges that conveyance of one page is completed in accordance with the above-mentioned Equations (1) and (2). For example, in the printer device 200' in which the printing target is the printing paper 201C of a cut sheet, since a size of the printing paper 201C is fixed, it is judged whether conveyance corresponding to a size corresponding to a selected paper feed tray is completed based on a detecting result of the paper discharging detecting sensor 532.

When conveyance of the first page is completed and a conveyance instruction of the second page (setting information table of the second page) has been received, the conveyance control unit 51 transmits the printable state report to the data transfer control units 30a, 30b, 30c, and 30d through the signal line 42 in SEQ121. Further, the conveyance control unit 51 causes conveyance of the printing paper 201 to continue to convey the second page based on information of the setting information table.

If the printable state report is received from the conveyance control unit 51, each of the data transfer control units 30a, 30b, 30c, and 30d starts printing the second page and notifies this to the printing control unit 322 (SEQ122a to 122d). After starting printing, each of the data transfer control units 30a, 30b, 30c, and 30d performs printing of one page in a time $t_{length}$, and when printing is completed, notifies this to the printing control unit 322 (SEQ123a to 123d).

The conveyance control unit 51 monitors conveyance of the printing paper 201, and judges whether conveyance of an additional one page is completed from after the above SEQ121. The conveyance control unit 51 receives the setting information tables only up to the second page. Therefore, if it is judged that conveyance of the additional one page is completed, the conveyance control unit 51 judges that printing is completed and stops conveying the printing paper 201. In SEQ124, the conveyance control unit 51 notifies the printing control unit 322 of a conveyance stopping report indicating that conveyance is stopped. By doing this, a series of printing processes are completed.

Setting Information Table

Next, a setting information table will be described. FIG. 14 illustrates an example of a setting information table according to the embodiment. A setting information table includes information common to the colors C, M, Y, and K and information for each color. The information common to the colors includes printing information which is information concerning a printing instruction to the printer engine. Further, the information for each color includes printing information and information to transfer data which is used to transfer printing image data from the high level device 10. Pieces of information included in a setting information table are not limited to be managed using a table format, but may be managed using a different data management format.

The information common to the colors in a setting information table according to the embodiment will be described. The information common to the colors includes a page identifier PBID and number of data per page as information other than the printing information. The page identifier PBID is a page identifier that identifies a printing page and a setting information table is identified by the page identifier PBID. The number of data per page is number of colors which are used in a page identified by the page identifier PBID. For example, in a case of monochrome in which printing is performed using one color of a color K, a value of the number of data per page is "1" and in a case of full colors in which printing is performed using four colors of C, M, Y, and K, a value of the number of data per page is "4".

The printing information in the information common to the colors will be described. The printing information includes resolution and gradation as information of printing image data to be printed and includes a paper conveyance length, a width of a paper, and a surface to be printed (front/rear) as information concerning a printing target. The printing information further includes a paper feed tray selection and a paper discharge tray selection as information of a conveyance system.

In the information of printing image data to be printed, the resolution indicates printing resolution in a main scanning direction and a sub scanning direction. Further, the gradation indicates bit number per pixel. In the information concerning the printing target, the paper conveyance length indicates a length of one page of the printing paper 201 in the conveyance direction represented with number of dots and the width of paper indicates a length of the printing paper 201 in a width direction represented with number of dots. The printing surface indicates which of a front surface and a rear surface of the printing paper 201 a relevant page is printed.

In the information of the conveyance system, the paper feed tray selection is an identifier that identifies that the printing paper 201, which is a printing target, is continuous forms paper or a cut sheet and identifies a paper feed tray if the printing paper 201, which is a printing target, is a cut sheet. In this example, the paper feed tray identifier indicates that a printing target is continuous forms paper when it has a value of "0", and that the printing target is a cut sheet when it has a value other than "0". Further, when a value of the paper feed tray identifier is not "0" and the printing target is a cut sheet, a value the paper feed tray identifier enables identification of a paper feed tray selected from a plurality of paper feed trays.

For example, in the printer device 200', if paper feed trays 220 to 224 are prepared for respective paper sizes, a paper size of a cut sheet can be specified by the paper feed tray identifier.

The paper discharge tray selection, similarly to the paper conveyance tray selection, is an identifier that identifies that the printing paper 201, which is a printing target, is continuous forms paper or a cut sheet, and identifies a size of the printing paper 201 if the printing paper 201, which is a printing target, is a cut sheet. In this example, the paper discharge tray identifier indicates that the printing target is continuous forms paper when it has a value of "0", and that the printing target is a cut sheet when it has a value other than "0". Further, when a value of the paper discharge tray identifier is not "0", a value of the paper discharge tray identifier enables identification of a paper discharge tray selected from a plurality of paper discharge trays.

The information for each color in a setting information table according to the embodiment will be described. The information for each color includes a color identifier to identify one of the colors C, M, Y, and K, information to transfer data, and printing information. The information to transfer data in the information for each color includes presence or absence of necessity of data transfer, an address of a data transferring source, an address of a data storing destination, and a data transfer size.

The address of a data transferring source indicates an address where printing image data of a page indicated by the page identifier PBID is stored in the high level device 10. The address of a data transferring source specifies printing image data, for example, in units of a raster (line). The address of a data storing destination is an address indicated by the above-mentioned input pointer. Therefore, whenever the input pointer is updated, the address of a data storing destination is also updated. The data transfer size indicates a data size of printing image data which is transferred by a request of the data transfer control units 30a to 30d, and for example, is a data size of printing image data of a page which is indicated by the page identifier PBID.

The data transfer size includes a boundary adjustment size to fit a size of printing image data with a size in units of a predetermined unit (for example, a unit of one byte). When one page is printed, printing image data of a data size indicated by the data transfer size is stored in the memories 31a to 31d.

The printing information in the information for each color will be described. The printing information includes presence or absence of necessity of printing, a nonprintable area at upper, lower, left, and right, and image information. The image information includes an X-direction effective size and a Y-direction effective size. The presence or absence of necessary of printing indicates whether to perform printing of a relevant color.

The nonprintable area at upper, lower, left, and right indicates a nonprintable area, where printing is not allowed, represented with number of dots from an upper limit (a leading end in a paper conveyance direction), a lower limit (a trailing end in a paper conveyance direction), a left end (a left end in a paper width direction as facing toward the paper conveyance direction), and a right end (a right end in the paper width direction as facing toward the paper conveyance direction) of a page region.

The X-direction effective size of the image information indicates a size that does not include a boundary adjustment region in the X-direction (paper width direction) represented with number of dots. The boundary adjustment region is provided so as to fit a data size with a size in units of a predetermined unit (for example, a unit of one byte) when a data size of one raster data has a fractional less than the predetermined unit. The Y-direction effective size indicates a size in the Y-direction (paper conveyance direction) represented with number of dots. In other words, the X-direction effective size indicates a size effectively printed in accordance with one raster data, and the Y-direction effective size indicates number of raster (the number of lines) to be printed with the X-direction effective size.

In this way, in a setting information table, various setting information concerning data transfer processing and print processing for all colors of Y, C, M, and K is included. In the printer controller 14, the CPU 321 creates a setting information table based on paper information and control information received from the high level device 10 and then writes the setting information table in the RAM 323. If control information specifies that a plurality of pages is to be printed, setting information tables, number of which corresponds to that of the plurality of pages and each of which is identified by a corresponding page identifier (PBID), are created.

When printing image data transferred from the high level device 10 is received, the CPU 321 in the printer controller 14 instructs the printing control unit 322 to transfer data and specifies the page identifier PBID. The printing control unit 322 reads out a setting information table specified by a page identifier from the RAM 323, sets setting information required for the printing control unit 322 itself in its own resister, and transmits the setting information table to the data transfer control units 30a to 30d for a color which is instructed to transfer data by the setting information table.

The data transfer control units 30a to 30d set information required at the time of transferring data by themselves from the setting information table in their own resisters and write the setting information table in the memories 31a to 31d of the data transfer control units 30a to 30d. In this case, all information included in the setting information table may be stored in the data transfer control units 30a to 30d. It is more preferable that information to be stored in a data transfer control unit is limited to information common to the colors and information concerning a color that is handled by the data transfer control unit so as to minimize a memory usage capacity.

Further, when the printing control unit 322 transmits a setting information table to one or a plurality of the data transfer control units 30a to 30d in accordance with a data transferring instruction from the CPU 321, if information to be transmitted is limited to the information common to the colors and information concerning the specified color, an amount of transferring data to be transmitted through the engine I/F control lines 40a to 40d is advantageously reduced to suppress load of the engine I/F control lines 40a to 40d.

When reception of all printing image data transferred from the high level device 10 is completed and printing is performed, the CPU 321 transmits a printing instruction and a page identifier to the printing control unit 322, similarly to reception of printing image data, regardless of whether the printer engine 15 is for a cut sheet or continuous forms paper. The printing control unit 322 reads out a setting information table specified by the page identifier from the RAM 323, transmit the setting information table again and transmit a conveyance instruction to the conveyance control unit 51. The printing control unit 322 transmits the printing instruction together with the page identifier to the data transfer control units 30a to 30d.

The conveyance control unit 51 starts conveying paper using paper conveyance information of the setting information table (information concerning a printing target and information of a conveyance system). In a case of the printer device 200 that uses continuous forms paper as a printing target, paper is conveyed using a paper conveyance length included in information concerning the printing target. Meanwhile, in a case of the printer device 200' that uses a cut sheet as a printing target, paper is conveyed using a surface to be printed included in the information concerning the printing target, paper feed tray selection and paper discharge tray selection included in information of the conveyance system.

When the printing instruction is received from the printing control unit 322, the respective data transfer control units 30a to 30d read out a setting information table specified by the page identifier from the respective memories 31a to 31d in the respective data transfer control units 30a to 30d and sets information required for printing operation among information included in the read setting information table in their respective own registers.

In this way, the conveyance control unit 51 absorbs a difference between a cut sheet printer device using a cut sheet as a printing target and a continuous forms paper printer device using continuous forms paper as a printing target, and printing image data is received and printing operation is performed using a setting information table that includes paper information so that it is possible to provide a printer controller 14 that can cooperate with both the cut sheet printer device and the continuous forms paper printer device.

Detailed Description of Printing Operation

Figure 15:
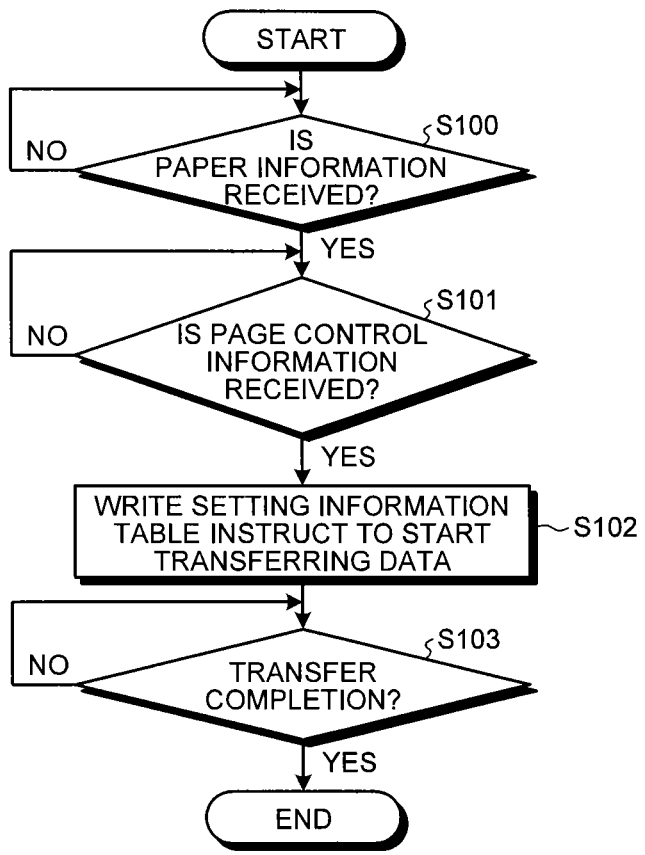
FIG. 15 is a flowchart of an example illustrating an operation of a CPU when printing image data is transferred from a high level device according to an embodiment.

Next, printing operation according to the embodiment will be described in more detail. FIG. 15 is a flowchart of an example illustrating an operation of the CPU 321 in the printer controller 14 when printing image data is transferred from the high level device 10.

The CPU 321 in the printer controller 14 waits to receive the paper information and the control information from the high level device 10 in steps S100 and S101. When the CPU 321 receives the paper information and the control information from the high level device 10 through the control line 12 via the printing control unit 322, the CPU 321 creates the above-mentioned setting information table based on the received paper information and the control information in the next step S102. The CPU 321 writes the created setting information table in the RAM 323. In addition, the CPU 321 issues the instruction to start transferring data to the printing control unit 322. The CPU 321 waits the transferring completion report from the printing control unit 322 after issuing the instruction to start transferring data (step S103). If the CPU 321 receives the transferring completion report from the printing control unit 322, a series of processing in the flowchart of FIG. 15 are completed.

Figure 16:
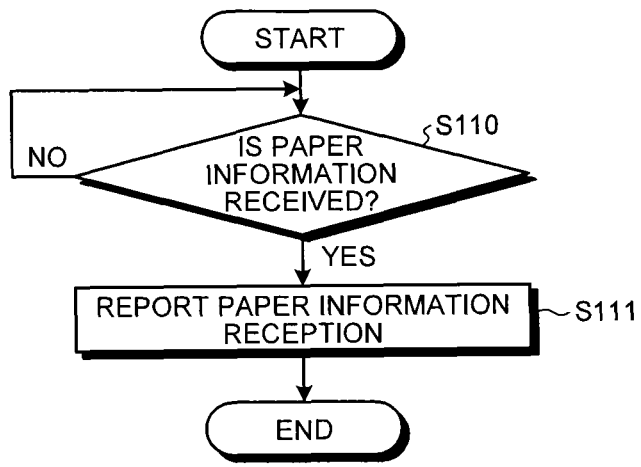
FIG. 16 is a flowchart of an example illustrating an operation of a printing control unit when paper information is received from a high level device according to an embodiment.

FIG. 16 is a flowchart of an example illustrating an operation of the printing control unit 322 when the paper information is received from the high level device 10. The printing control unit 322 waits the paper information from the high level device 10 (step S110). When the paper information is received, the printing control unit 322 reports the reception of the paper information to the CPU 321 (step S111). When the paper information reception report is completed, a series of processing in the flowchart of FIG. 16 are completed.

Figure 17:
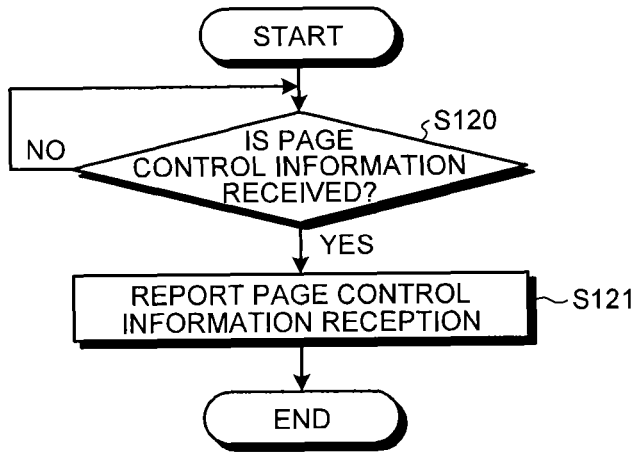
FIG. 17 is a flowchart of an example illustrating an operation of a printing unit when control information is received from a high level device according to an embodiment.

FIG. 17 is a flowchart of an example illustrating an operation of the printing control unit 322 when the control information (page control information) is received from the high level device 10. The printing control unit 322 waits the page control information from the high level device 10 (step S120). When the page control information is received, the printing control unit 322 reports the reception of the page control information to the CPU 321 (step S121). When the page control information reception report is completed, a series of processing in the flowchart of FIG. 17 are completed.

Figure 18:
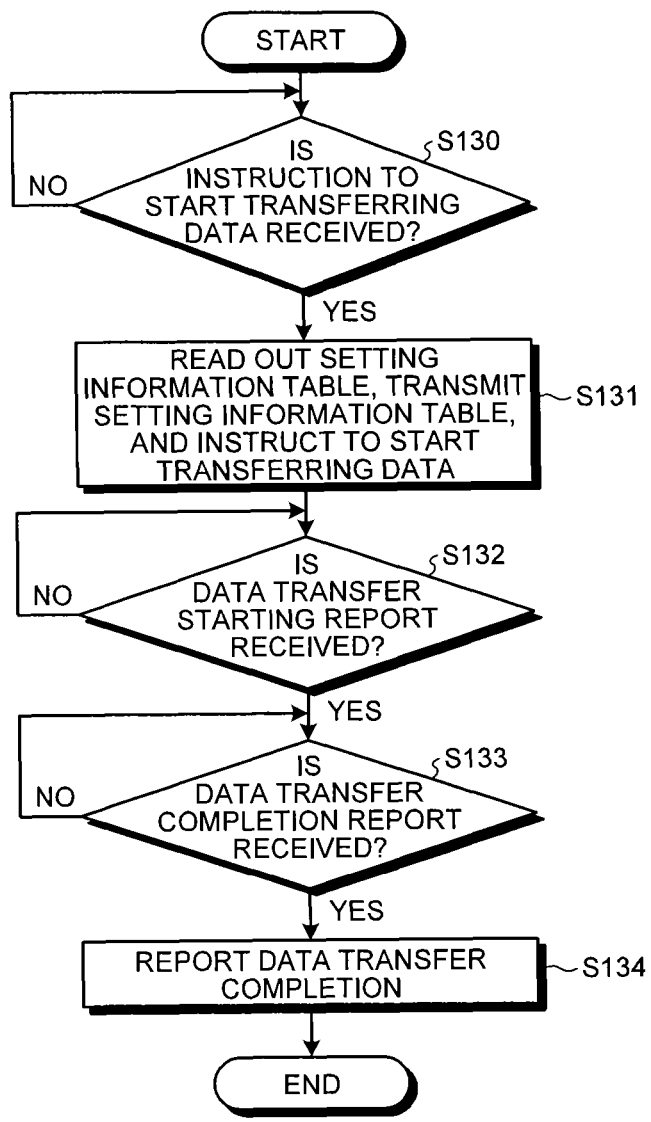
FIG. 18 is a flowchart of an example illustrating an operation of a printing control unit at a transferring time when printing image data is transferred from a high level device according to an embodiment.

FIG. 18 is a flowchart of an example illustrating an operation of the printing control unit 322 at a transferring time when printing image data is transferred from the high level device 10. The printing control unit 322 waits the instruction to start transferring data from the CPU 321 (step S130). When the instruction to start transferring data is received, the printing control unit 322 reads out the setting information table including a PBID of a corresponding page from the RAM 323 in the next step S131 and transmits the setting information table to the data transfer control units 30a to 30d. The printing control unit 322 issues the instruction to start transferring data to the data transfer control units 30a to 30d.

In the next step S132, the printing control unit 322 waits the report of data transfer starting from the data transfer control units 30a to 30d. When the report of data transfer starting is received from the data transfer control units 30a to 30d, the printing control unit 322 waits the report of data transfer completion from the data transfer control units 30a to 30d in the next step S133. When the report of data transfer completion is received from the data transfer control units 30a to 30d, the printing control unit 322 reports the data transfer completion to the CPU 321 in the next step S134. If the report of data transfer completion is completed, a series of processing in the flowchart of FIG. 18 are completed.

Figure 19:
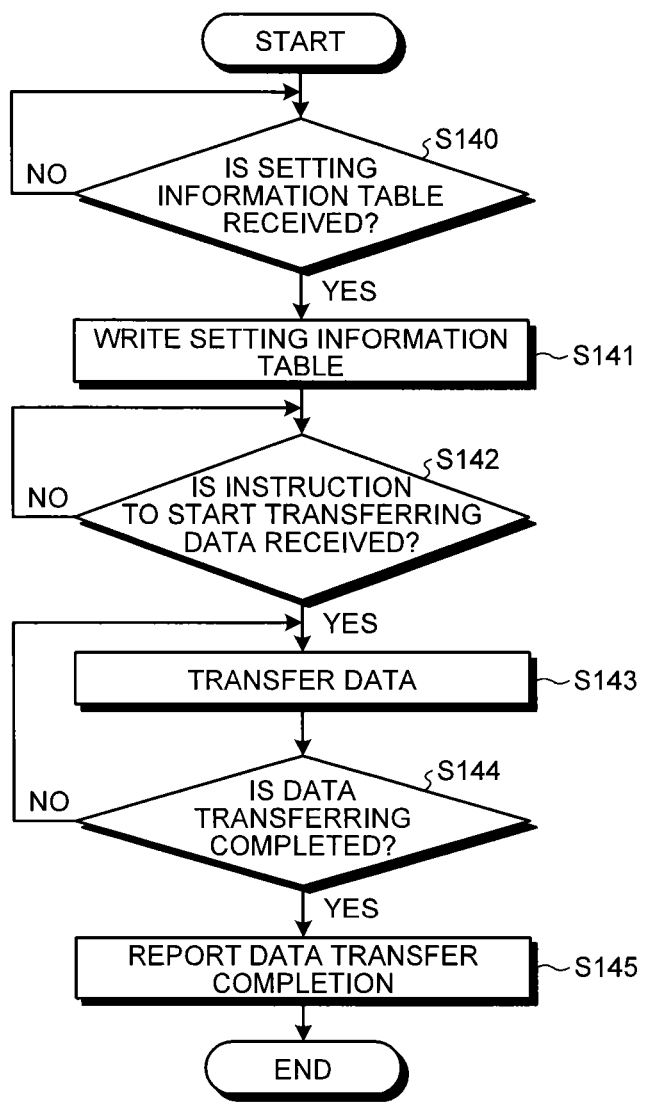
FIG. 19 is a flowchart of an example illustrating operations of data transfer control units at a transferring time when printing image data is transferred from a high level device according to an embodiment.

FIG. 19 is a flowchart of an example illustrating operations of data transfer control units 30a to 30d at a transferring time when printing image data is transferred from the high level device 10. Here, for the convenience of description, the data transfer control unit 30a will be described as an example. The data transfer control unit 30a waits the setting information table from the printing control unit 322 (step S140).

When the setting information table is received from the printing control unit 322, the data transfer control unit 30a writes the received setting information table, for example, in a predetermined region of the memory 31a in the data transfer control unit 30a (step S141). However, the present invention is not limited to the memory 31*a*, but the setting information table may be written in a register which is included in the data transfer control unit 30*a*.

In the next step S142, the data transfer control unit 30*a* waits the instruction to start transferring the data from the printing control unit 322. If the instruction to start transferring the data is received from the printing control unit 322, in the next step S143, the data transfer control unit 30*a* requests the printing image data to the high level device 10 and receives the printing image data transferred from the high level device 10 through the data line 11*a* in response to the request. The received printing image data is written in the memory 31*a*.

If it is judged that the printing image data for one page specified by the setting information table is completely transferred (step S144), the data transfer control unit 30*a* transmits the report of data transfer completion to the printing control unit 322 in the next step S145. If the report of data transfer completion is transmitted, a series of processing in the flowchart of FIG. 19 are completed.

Figure 20:
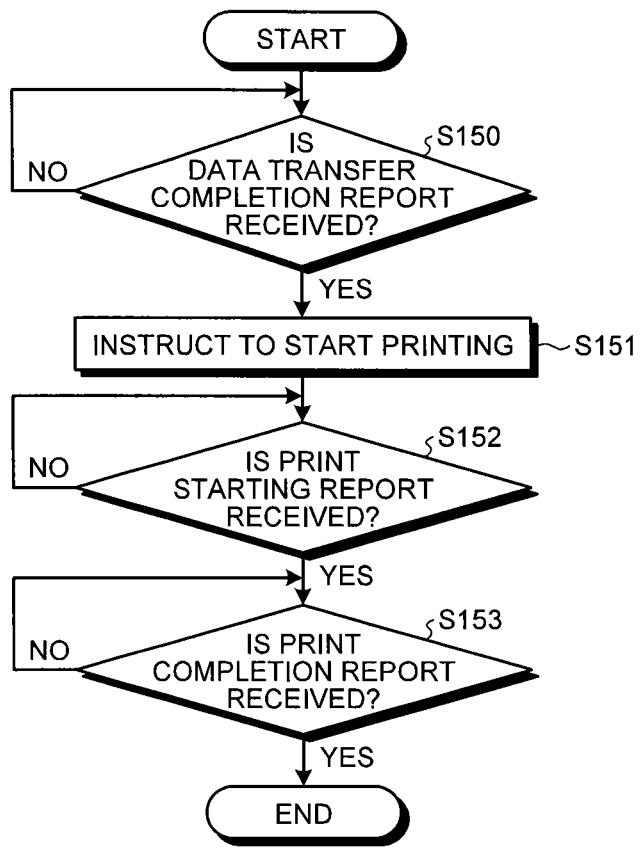
FIG. 20 is a flowchart of an example illustrating an operation of a CPU at the time of printing operation according to an embodiment.

FIG. 20 is a flowchart of an example illustrating an operation of the CPU 321 in the printer controller 14 at the time of printing operation. The CPU 321 waits the report of data transfer completion from the printing control unit 322 (step S150). If the report of data transfer completion is received from the printing control unit 322, the CPU 321 issues the instruction to start printing to the printing control unit 322 in the next step S151. After issuing the instruction to start printing, the CPU 321 waits the report of print starting from the printing control unit 322 (step S152). When the report of print starting is received, the CPU 321 waits the report of print completion from the printing control unit 322 in the next step S153. When the report of print completion is received from the printing control unit 322, a series of processing in the flowchart of FIG. 20 are completed.

Figure 21:
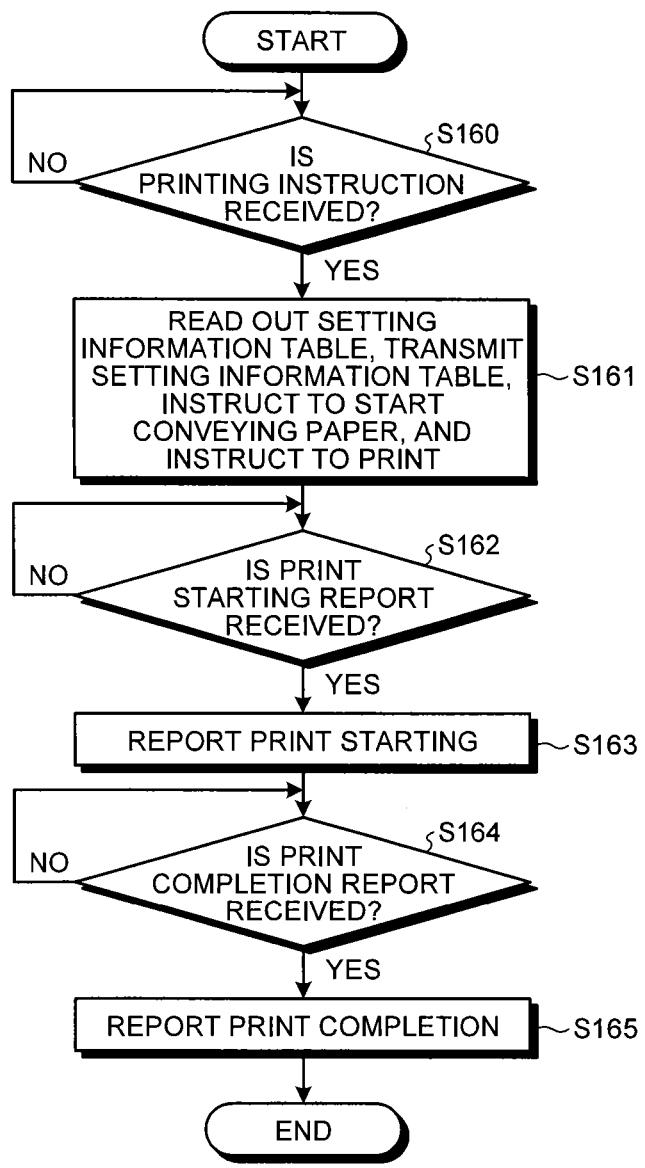
FIG. 21 is a flowchart of an example illustrating an operation of a printing control unit at the time of printing operation according to an embodiment.

FIG. 21 is a flowchart of an example illustrating an operation of the printing control unit 322 at the time of printing operation. The printing control unit 322 waits the printing instruction from the CPU 321 (step S160). When the printing instruction is received from the CPU 321, in the next step S161, the printing control unit 322 reads out the setting information table whose PBID corresponds to the instruction to start printing from the RAM 323 to transmit the setting information table to the conveyance control unit 51. When the setting information table is transmitted to the conveyance control unit 51, the printing control unit 322 issues the instruction to start conveying the paper to the conveyance control unit 51 and thereafter, issues the printing instruction to the data transfer control units 30*a* to 30*d*.

After issuing the printing instruction to the data transfer control units 30*a* to 30*d*, the printing control unit 322 waits the report of print starting from the data transfer control units 30*a* to 30*d* (step S162). When the report of print starting is received from the data transfer control units 30*a* to 30*d*, the printing control unit 322 reports the print starting to the CPU 321 (step S163). In the next step S164, the printing control unit 322 waits the report of print completion from the data transfer control units 30*a* to 30*d*. When the report of print completion is received from the data transfer control units 30*a* to 30*d*, the printing control unit 322 reports the print completion to the CPU 321 (step S165). If the report of print completion is completed, a series of processing in the flowchart of FIG. 21 are completed.

Figure 22:
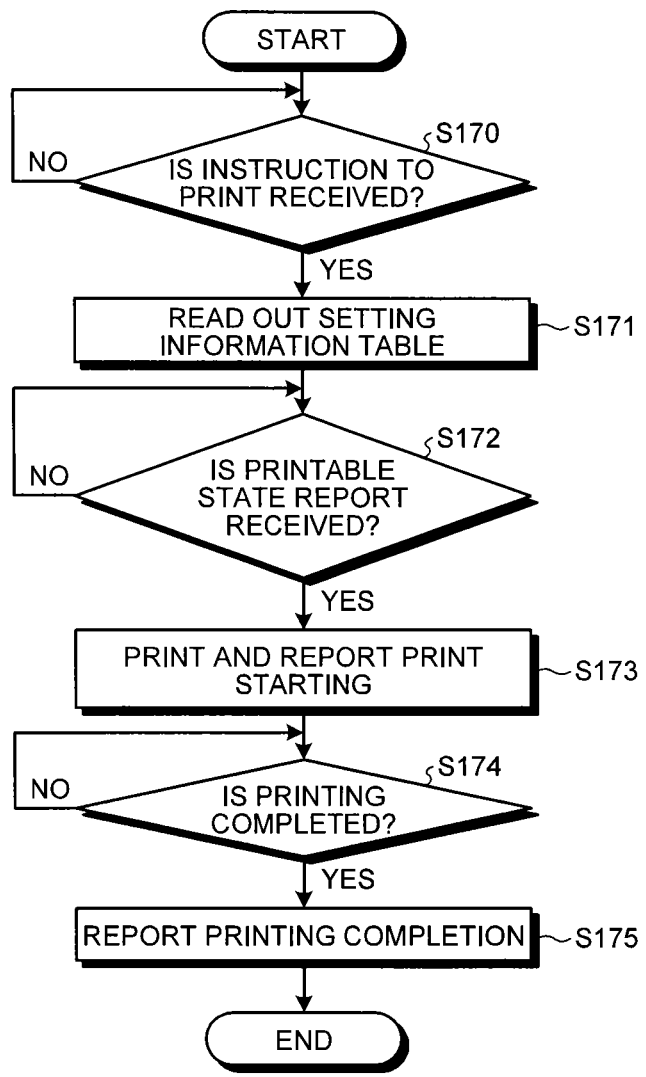
FIG. 22 is a flowchart of an example illustrating operations of data transfer control units at the time of printing operation according to an embodiment.

FIG. 22 is a flowchart of an example illustrating operations of the data transfer control units 30*a* to 30*d* at the time of printing operation. Here, the data transfer control unit 30*a* will be described as an example. The data transfer control unit 30*a* waits the instruction of printing from the printing control unit 322 (step S170). When the instruction of printing is received from the printing control unit 322, in the next step S171, the data transfer control unit 30*a* reads out the setting information table of a page corresponding to the printing instruction which is written, for example, in the memory 31*a* of the data transfer control unit 30*a* in step S141 of FIG. 19.

The data transfer control unit 30*a*, in the next step S172, waits the printable state report from the conveyance control unit 51. When the printable state report is received from the conveyance control unit 51, the data transfer control unit 30*a*, in the next step S173, start printing based on the contents set in the setting information table and transmits the report of the print starting of the printing to the printing control unit 322. When the printing for one page set in the setting information table is completed (step S174), the data transfer control unit 30*a* transmits the report of print completion to the printing control unit 322 (step S175). When the report of print completion is completed, a series of processing in the flowchart of FIG. 22 are completed.

Figure 23:
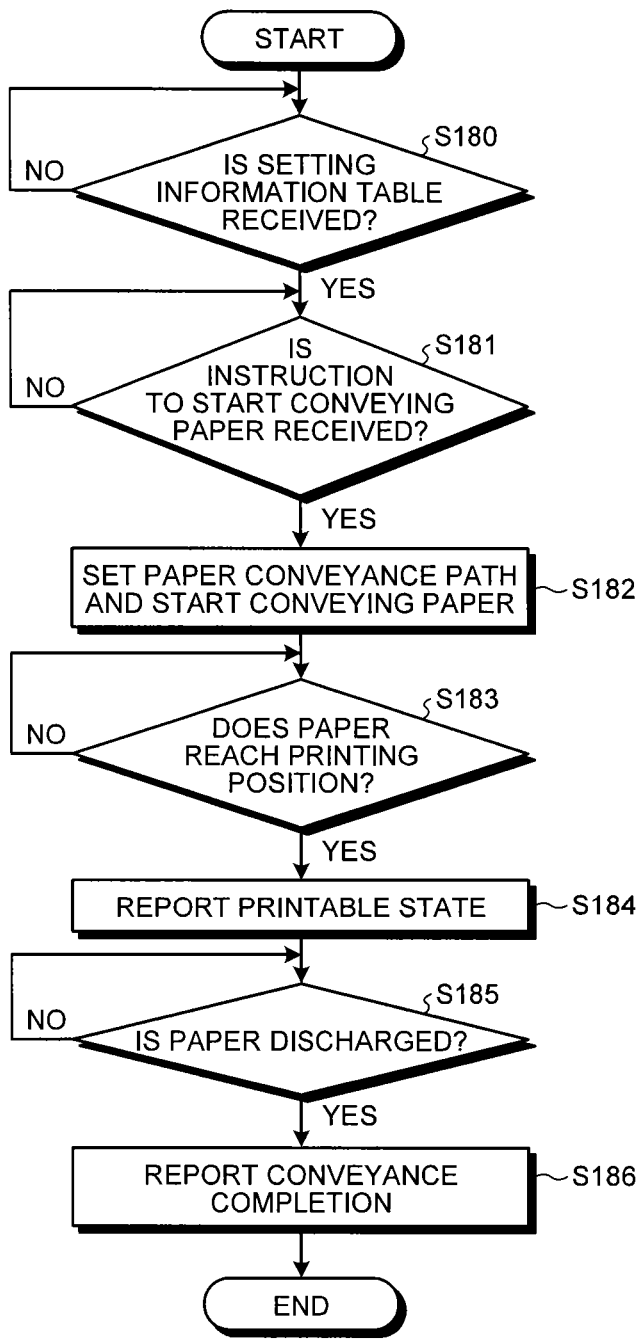
FIG. 23 is a flowchart of an example illustrating an operation of a cut sheet conveyance control unit when a printing target is a cut sheet according to an embodiment.

FIG. 23 is a flowchart of an example illustrating an operation of the cut sheet conveyance control unit 51B when a printing target is a cut sheet. The cut sheet conveyance control unit 51B waits the setting information table from the printing control unit 322 (step S180). If the setting information table is received from the printing control unit 322, the cut sheet conveyance control unit 51B, in the next step S181, waits the instruction to start conveying a paper from the printing control unit 322. If the instruction to start conveying a paper is received from the printing control unit 322, the cut sheet conveyance control unit 51B, in the next step S182, sets the conveyance path of the printing paper 201C based on the information of the paper feed tray selection and the paper discharge tray selection in the setting information table received in step S180. The cut sheet conveyance control unit 51B controls the printing paper 201C to be conveyed by the set conveyance path.

In the next step S183, the cut sheet conveyance control unit 51B waits that the printing paper 201C is conveyed up to a predetermined printing position. If the cut sheet conveyance control unit 51B detects that the printing paper 201C is conveyed up to the predetermined printing position based on the detection output of the printing position detecting sensor 531, in the next step S184, the cut sheet conveyance control unit 51B transmits the printable state report to the data transfer control units 30*a* to 30*d*. The cut sheet conveyance control unit 51B, in step S185, waits that the printing paper 201C is discharged. If the cut sheet conveyance control unit 51B detects that the printing paper 201C is discharged based on the detection output of the paper discharging detecting sensor 532, in the next step S186, the cut sheet conveyance control unit 51B transmits the report of transfer completion to the printing control unit 322. When the report of transfer completion is transmitted, a series of processing in the flowchart of FIG. 23 are completed.

Figure 24:
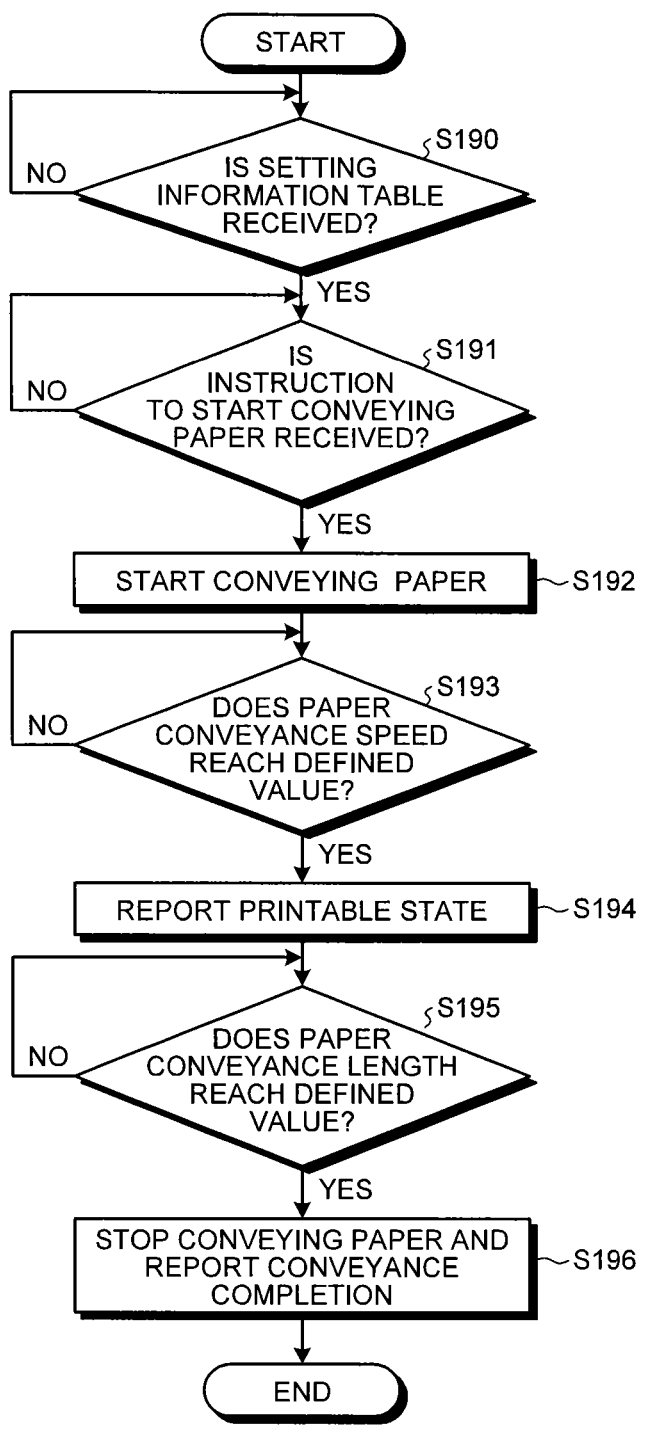
FIG. 24 is a flowchart of an example illustrating an operation of a continuous forms paper conveyance control unit when a printing target is continuous forms paper according to an embodiment.

FIG. 24 is a flowchart of an example illustrating an operation of a continuous forms paper conveyance control unit 51A when a printing target is continuous forms paper. The continuous forms paper conveyance control unit 51A waits the setting information table from the printing control unit 322 (step S190). If the setting information table is received from the printing control unit 322, the continuous forms paper conveyance control unit 51A, in the next step S191, waits the instruction to start conveying a paper from the printing control unit 322. If the instruction to start conveying a paper is received from the printing control unit 322, the continuous forms paper conveyance control unit 51A, in the next step S192, creates a high level of paper conveyance instructing signal to drive the conveyance motor 510 to start conveying the printing paper 201R. The continuous forms paper conveyance control unit 51A, in step S193, waits that the conveyance speed of the printing paper 201R reaches a defined value.

When the continuous forms paper conveyance control unit 51A detects that the paper conveyance speed at which the printing paper 201R is conveyed reaches the defined value based on the detection output of the paper conveyance speed detecting sensor 511, in the next step S194, the continuous forms paper conveyance control unit 51A transmits the printable state report to the data transfer control units 30a to 30d. The continuous forms paper conveyance control unit 51A, in step S195, waits that a paper having a paper conveyance length set in the setting information table is completely conveyed. If the continuous forms paper conveyance control unit 51A detects that the paper conveyance length reaches the defined value based on the count value of the pulse number of the vertical synchronizing signal, the continuous forms paper conveyance control unit 51A stops conveying the paper in the next step S196 and transmits the report of transfer completion to the printing control unit 322. When the report of transfer completion is transmitted, a series of processing in the flowchart of FIG. 24 are completed.

As described with reference to FIGS. 23 and 24, the cut sheet conveyance control unit 51B and the continuous forms paper conveyance control unit 51A have a common interface for the printing control unit 322 and the data transfer control units 30a to 30d. Therefore, according to the embodiment, the conveyance system may use in common the printing control unit 322, that is, the printer controller 14 in the printer device 200' that uses the cut sheet as a printing target and the printer device 200 that uses the continuous forms paper as a printing target.

Example of Processing According to Embodiment

Figure 25:
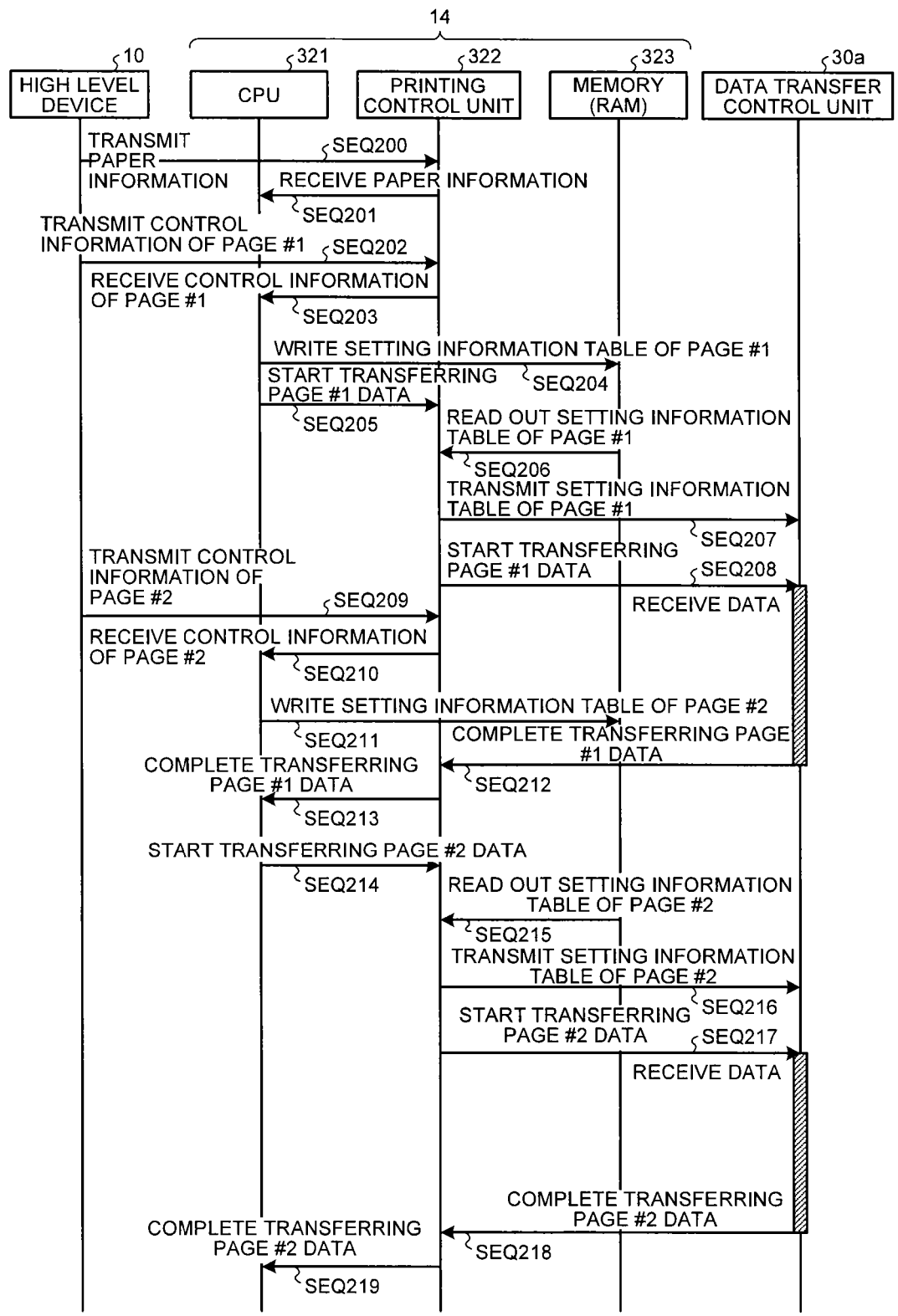
FIG. 25 is a sequence diagram illustrating an example of transfer processing of printing image data according to an embodiment in detail.

Next, the print processing according to the embodiment will be described in detail. FIG. 25 is a sequence diagram illustrating an example of a transfer processing of printing image data according to the embodiment in detail. The sequence diagram of FIG. 25 illustrates an example of the processing when two pages are continuously printed so as to focus on the transfer processing of the printing image data. Further, in FIG. 25, the data transfer control unit 30a is illustrated as a representative of the data transfer control units 30a to 30d for the respective colors.

First, in SEQ200, paper information is transmitted from the high level device 10 to the printer controller 14. The paper information is received in the printing control unit 322 in the printer controller 14. The printing control unit 322 sends the received paper information to the CPU 321 (SEQ201). The high level device 10 transmits control information concerning print job starting of a first page to the printer controller 14 (SEQ202). The control information is received in the printing control unit 322 in the printer controller 14. The printing control unit 322 sends the received control information to the CPU 321 (SEQ203).

The CPU 321 creates the setting information table (first page) described with reference to FIG. 14 based on the paper information and the control information concerning print job starting of a first page sent from the printing control unit 322 in SEQ201 and SEQ203. The CPU 321 writes the created setting information table in the RAM 323 in the printer controller 14 (SEQ204). Next, the CPU 321 issues the instruction to start transferring the first page of printing image data to the printing control unit 322 (SEQ205).

In response to the instruction to start transferring from the CPU 321, the printing control unit 322 reads out the setting information table in which the page identifier indicates the first page from the setting information table written in the RAM 323 (SEQ206) and transmits the read setting information table to the data transfer control unit 30a (SEQ207). The data transfer control unit 30a writes the setting information table transmitted from the printing control unit 322 in the memory 31a. Continuously, the printing control unit 322 instructs the data transfer control unit 30a to start the transfer processing of the first page of the printing image data (SEQ208).

In response to the instruction to start the transfer processing from the printing control unit 322, referring to the setting information table transmitted from the printing control unit 322 and written in the memory 31a in SEQ207, the data transfer control unit 30a requests the high level device 10 to transfer the printing image data in accordance with the information to transfer data in the setting information table and receives the transferred printing image data to be written in the memory 31a.

When the first page of the printing image data is completely transferred, the data transfer control unit 30a notifies the completion to the printer controller 14 (SEQ212). The notification is received by the printing control unit 322 in the printer controller 14. If the notification is received, the printing control unit 322 reports the transfer completion of the first page of the printing image data to the CPU 321 (SEQ213).

Here, as illustrated in SEQ209, while transferring the first page of the printing image data in the data transfer control unit 30a, control information concerning the print job starting for a second page is transmitted from the high level device 10 to the printer controller 14. Also in this case, similarly to the above description, the printing control unit 322 that receives the control information sends the received control information to the CPU 321 (SEQ210). The CPU 321 creates the setting information table for a second page based on the paper information sent from the printing control unit 322 in SEQ200 and the control information sent from the printing control unit 322 in SEQ210. The CPU 321 writes the created setting information table in the RAM 323 (SEQ211).

In the example of FIG. 25, at the time when the CPU 321 writes the setting information table in the RAM 323 in SEQ211, the transfer processing of the printing image data from the high level device 10 is being performed in the data transfer control unit 30a. The CPU 321 does not receive the report of the transfer completion of the first page of the printing image data from the data transfer control unit 30a by the above-mentioned SEQ213. Therefore, the issuance of the instruction to start transferring the second page of the printing image data is reserved.

If the CPU 321 receives the report of the transfer completion of the first page of the printing image data from the data transfer control unit 30a in SEQ213, the CPU 321 issues the instruction to start transferring the second page of the printing image data to the printing control unit 322 in SEQ214. In response to the instruction, the printing control unit 322 reads out the setting information table in which the page identifier indicates the second page from the setting information table written in the RAM 323 (SEQ215) to transmit the setting information table to the data transfer control unit 30a (SEQ216). The data transfer control unit 30a writes the setting information table of the second page transmitted from the printing control unit 322 in the memory 31a.

Continuously, the printing control unit 322 instructs the data transfer control unit 30a to start the transfer processing of the second page of the printing image data (SEQ217). The data transfer control unit 30a requests the high level device 10 to transfer the printing image data in accordance with the information to transfer data in the setting information table of the second page written in the memory 31*a* in response to the instruction to start the transfer processing and receives the transferred printing image data to write the printing image data in the memory 31*a*. If the second page of the printing image data is completely transferred, the data transfer control unit 30*a* notifies the completion to the printer controller 14 (SEQ218). If the notification of the transfer completion is received, the printing control unit 322 in the printer controller 14 reports the transfer completion of the second page of the printing image data to the CPU 321 (SEQ219).

Figure 26:
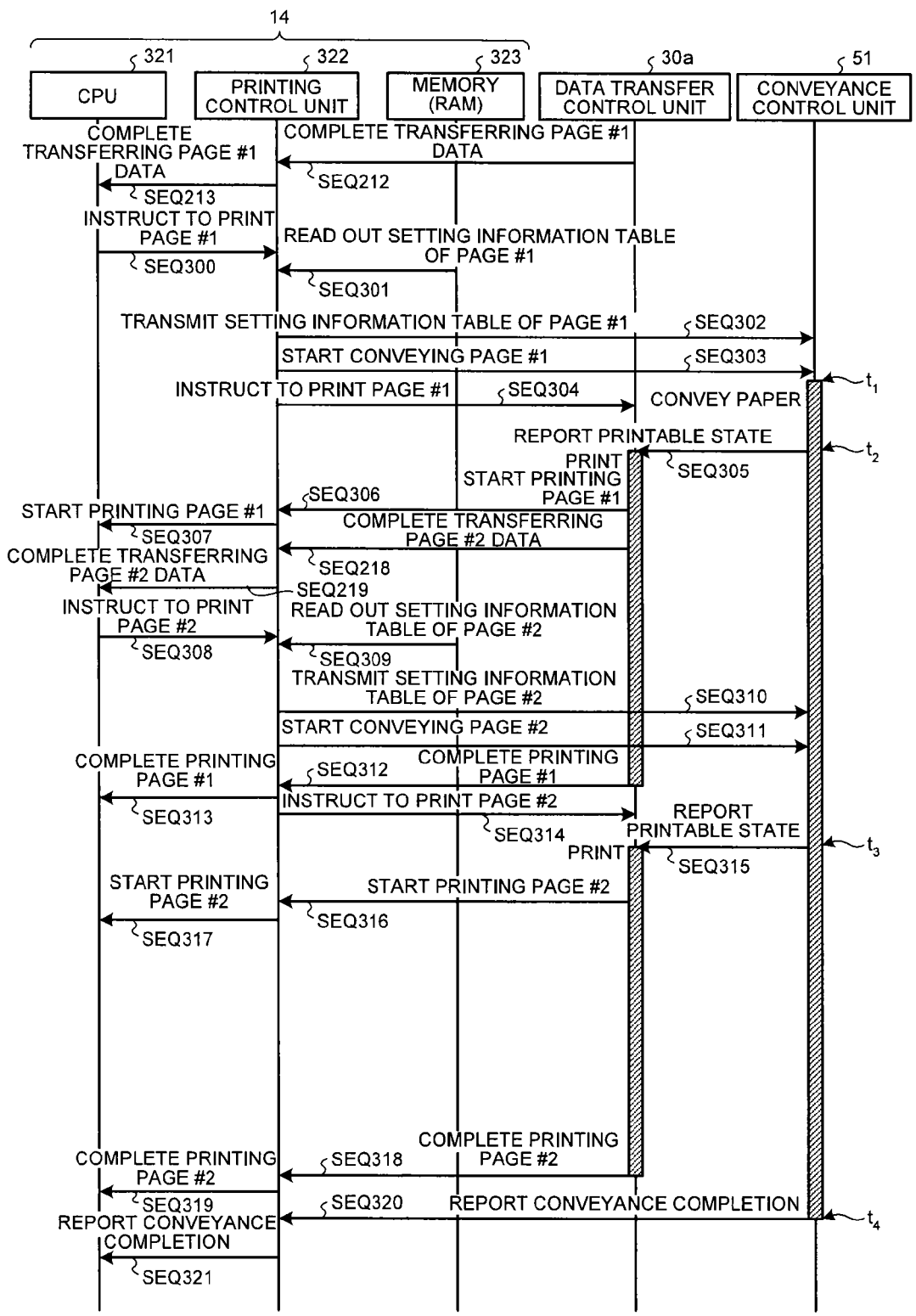
FIG. 26 is a sequence diagram illustrating an example of print and conveyance processing according to an embodiment in detail.

FIG. 26 is a sequence diagram illustrating an example of print and conveyance processing according to the embodiment in detail. The sequence diagram of FIG. 26 focuses on the processing after the transfer processing of the printing image data to the data transfer control unit 30*a* is completed. Further, similarly to the above description, in FIG. 26, the data transfer control unit 30*a* is illustrated as a representative of the data transfer control units 30*a* to 30*d* for the respective colors. Further, in FIG. 26, parts that are common to the sequence diagram of FIG. 25 are denoted by the same reference numerals and the description thereof will be omitted.

In SEQ212, it is notified that the first page of the printing image data is completely transferred from the data transfer control unit 30*a* to the printing control unit 322 and in response to the notification, in SEQ213, the completion of transferring the first page of the printing image data is reported from the printing control unit 322 to the CPU 321. The CPU 321 issues the printing instruction to print the first page to the printing control unit 322 in SEQ300 in response to the report of the transfer completion of the first page of the printing image data.

If the instruction to print the first page is received, the printing control unit 322 reads out the setting information table in which the page identifier indicates the first page from the RAM 323 (SEQ301) to transmit the setting information table to the conveyance control unit 51 (SEQ302). The conveyance control unit 51 receives the setting information table to write the setting information table in its own register or memory. The printing control unit 322, continuously, transmits the conveyance starting instruction to the conveyance control unit 51 (SEQ303). The printing control unit 322 transmits the instruction to print the first page to the data transfer control unit 30*a* (SEQ304).

After the conveyance starting instruction is received from the printing control unit 322 in SEQ303, the conveyance control unit 51 starts the conveyance operation of the printing paper (time $t_1$). When the conveyance control unit 51 judges that the printing paper is conveyed to reach a printable state (time $t_2$), the printable state report is transmitted to the data transfer control unit 30*a* through the signal line 42 (SEQ305).

For example, as described above, in the case of the printer device 200 that uses the printing paper 201R of continuous forms paper, a high level of paper conveyance instructing signal is generated to drive the conveyance motor 510 and convey the printing paper 201R. Based on the detecting output of the paper conveyance speed detecting sensor 511, if it is detected that the conveyance speed of the printing paper 201R reaches a defined speed, the printable state is reported.

For example, as described above, in the case of the printer device 200' that uses the printing paper 201C of a cut sheet, the printing paper 201C is conveyed by the paper feed tray, the paper discharge tray, and the path which are selected by the conveyance path selecting unit 521 based on the paper feed tray selection and the paper discharge tray selection of the setting information table. Therefore, if the printing position detecting sensor 531 detects that the printing paper 201C reaches a predetermined printing position, the printable state is reported.

If the printable state is reported from the conveyance control unit 51, the data transfer control unit 30*a* performs printing on the printing paper 201 by the first page of the printing image data written in the memory 31*a*. When the printing is performed, the print starting of the first page is notified to the printing control unit 322 (SEQ306). The printing control unit 322 receives the notification and reports the print starting of the first page to the CPU 321 (SEQ307).

Here, before completing the printing of the first page, the transfer processing of the second page of the printing image data is completed. In the example of FIG. 26, immediately after notifying the print starting of the first page in SEQ306 to the printing control unit 322, the data transfer control unit 30*a* notifies the printing control unit 322 that the second page of the printing image data is completely transferred (SEQ218). In response to the notification, the printing control unit 322 reports the completion of transferring the second page of the printing image data to the CPU 321 (SEQ219).

If the report of transfer completion of the second page of the printing image data is received, the CPU 321 issues the printing instruction to print the second page to the printing control unit 322 (SEQ308). The printing control unit 322 reads out a setting information table in which the page identifier indicates the second page among the setting information tables written in the RAM 323 (SEQ309) and transmits the read setting information table to the conveyance control unit 51 (SEQ310) in response to the printing instruction.

In this case, the printing control unit 322 reserves the processing to transmit the printing instruction of the second page to the data transfer control unit 30*a*. In other words, the transmission of the printing instruction is performed by waiting the notification of the printing completion of the first page.

Continuously, the printing control unit 322 transmits the conveyance starting instruction to the conveyance control unit 51 (SEQ311). The conveyance control unit 51 controls conveyance of the printing paper 201 in response to the conveyance starting instruction. For example, as described above, in the case of the printer device 200 that uses the printing paper 201R which is continuous forms paper, the paper conveyance instructing signal is continuously at a high level, and thus the printing paper 201R is continuously conveyed. Further, for example, in the case of the printer device 200' that uses the printing paper 201C which is a cut sheet, a next printing paper 201C starts to be conveyed by the paper feed tray, the paper discharge tray, and the path which are selected by the conveyance path selecting unit 521 based on the paper feed tray selection and the paper discharge tray selection of the setting information table.

When the first page is completely printed, the data transfer control unit 30*a* notifies the completion to the printing control unit 322 (SEQ312). The printing control unit 322 reports the printing completion to the CPU 321 in response to the print completion notification (SEQ313) and transmits the printing instruction of the second page to the data transfer control unit 30*a* (SEQ314) at the same time. If the printing instruction of the second page is received, the data transfer control unit 30*a* waits that the printable state is reported from the conveyance control unit 51.

At the time $t_3$, the conveyance control unit 51 judges that the printing paper 201 is conveyed to reach a printable state. The conveyance control unit 51 transmits the report of the printable state to the data transfer control unit 30*a* (SEQ315). The data transfer control unit 30*a* prints the second page in response to the report of the printable state. The data transfer control unit 30a notifies the print starting of the second page to the printing control unit 322 (SEQ316). The printing control unit 322 receives the notification to report the print starting of the second page to the CPU 321 (SEQ317).

If the second page is completely printed, the data transfer control unit 30a notifies the completion to the printing control unit 322 (SEQ318). The printing control unit 322 reports the print completion to the CPU 321 in response to the print completion notification (SEQ319).

Further, the conveyance control unit 51 conveys the paper from the time $t_3$ when a printable state is reached to the time $t_4$. For example, if it is detected that a paper for one page is conveyed, the conveyance control unit 51 stops conveying the paper. The report of the conveyance completion is transmitted to the printing control unit 322 (SEQ320). The printing control unit 322 reports the conveyance completion to the CPU 321 in response to the report of the conveyance completion (SEQ321).

As described above, in this embodiment, the communication between the conveyance control unit 51 and other parts, for example, the printing control unit 322 does not depend on whether the printing is performed on the continuous forms paper or on the cut sheet in the printer engine 15. Therefore, the interface of the printing control unit 322 may be commonly used for the printer device that prints on the continuous forms paper and the printer device that prints on the cut sheet.

The present embodiment provide an advantageous effect of enabling common control for different paper conveyance methods.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device, comprising:
    a storage unit configured to store image data transferred from a high level device;
    a conveyance control unit configured to control conveyance of a printing medium and output a notification of a printable state when the printing medium is conveyed to reach a predetermined printable state;
    a printing unit configured to print the image data stored in the storage unit on the printing medium in response to the notification of the printable state output from the conveyance control unit; and
    a printing control unit configured to create print setting information including conveyance control information to control conveyance of the printing medium from printing information specified from the high level device and transmit the print setting information at least to the conveyance control unit,
    wherein the conveyance control unit controls conveyance of the printing medium in accordance with the conveyance control information included in the print setting information.

2. The printing device according to claim 1, wherein the conveyance control unit has any one of:
    a first conveyance unit configured to convey continuous forms paper in which pages are continuous as the printing medium; and
    a second conveyance unit configured to convey a cut sheet which is cut in a predetermined size to form a page as the printing medium,
    if the conveyance control unit has the first conveyance unit, the conveyance control unit judges that a printing medium is conveyed to reach the printable state when a conveyance speed reaches a defined speed, and
    if the conveyance control unit includes the second conveyance unit, the conveyance control unit judges that a printing medium is conveyed to reach the printable state when the printing medium reaches a predetermined position.

3. The printing device according to claim 1, wherein the conveyance control information includes:
    paper kind information indicating that a printing medium is continuous forms paper in which pages are continuous or a cut sheet which is cut in a predetermined size to form a page;
    path information to select a printing path when the paper kind information indicates the cut sheet; and
    conveyance length information indicating a length of a one page in a conveyance direction.

4. The printing device according to claim 1, wherein the print setting information further includes transfer information to transfer the image data transferred from the high level device, and
    the storage unit requests the high level device to transfer the image data in accordance with the transfer information.

5. A control method of a printing device, comprising:
    a storing step in which a storage unit stores image data transferred from a high level device;
    a conveyance control step in which a conveyance control unit controls conveyance of a printing medium and outputs a notification of a printable state when the printing medium is conveyed to reach a predetermined printable state;
    a printing step in which a printing unit prints the image data stored in the storing step on the printing medium in response to the notification of the printable state output in the conveyance control step; and
    a printing control step in which a printing control unit creates print setting information including conveyance control information to control conveyance of the printing medium from printing information specified from the high level device and transmits the print setting information at least to the conveyance control unit,
    wherein, in the conveyance control step, conveyance of the printing medium is controlled in accordance with the conveyance control information included in the print setting information.

* * * * *